United States Patent [19]

Konheim et al.

[11] 4,393,269

[45] Jul. 12, 1983

[54] METHOD AND APPARATUS INCORPORATING A ONE-WAY SEQUENCE FOR TRANSACTION AND IDENTITY VERIFICATION

[75] Inventors: Alan G. Konheim, Yorktown Heights; Stephen M. Matyas; Carl H. Meyer, both of Kingston, all of N.Y.

[73] Assignee: International Business Machines Corporation, Armonk, N.Y.

[21] Appl. No.: 229,494

[22] Filed: Jan. 29, 1981

[51] Int. Cl.$^3$ .............................................. H04L 9/00
[52] U.S. Cl. ................................ 178/22.08; 178/22.10
[58] Field of Search ............... 178/22.05, 22.08, 22.09, 178/22.10

[56] References Cited

U.S. PATENT DOCUMENTS 4,203,166  5/1980  Ehrsam et al. ................... 178/22.09
4,264,782  4/1981  Konheim ........................... 178/22.08

OTHER PUBLICATIONS

Miles E. Smid, "Integrating the Data Encryption Standard into Computer Networks", IEEE Transactions on Communications, vol. Com-29, No. 8, Jun. 1981, pp. 762-772.
"Cryptography: A New Dimension in Computer Data Security", John Wiley & Sons, New York, (1982), pp. 386-419.

Primary Examiner—Sal Cangialosi
Attorney, Agent, or Firm—Roy R. Schlemmer

[57] ABSTRACT

A method and apparatus for verifying both the content of a transaction and the identity of the parties thereto. The system includes a plurality of terminals connected together over a common communication channel wherein a given pair of users located at different terminals on the system have exchanged a contract comprising a plurality of reference signatures each of which constitutes the final member of a one-way keyed signature sequence and each of which is a one-way function of each user's secret encryption key ($K_x$) and a number (NUM) known to both parties. Each terminal connected to the system includes means for generating a multidigit ranking vector which is a cryptographic function of the entire message (DATA) to be transmitted. Further means are provided for forming as many signature elements as there are digits in said ranking vector, the particular signature element being an intermediate member of a predetermined one-way keyed signature sequence specified by an associated digit of the ranking vector. Additional means are provided for initiating the generation of a separate keyed signature sequence to derive each signature element beginning with a starting element which requires that user's secret encryption key ($K_x$) and the number (NUM) and continuing the generation of successive members of the one-way keyed signature sequence until the particular signature sequence element ($KSS_p$) which was specified by the associated ranking vector digit ($p$) is obtained. When the appropriate sequence of one-way keyed signature sequence elements has been generated as specified by the ranking vector, this sequence of signature elements is appended onto the original message (DATA) and transmitted to a receiver. Means are provided in each terminal which are activated upon receipt of an appropriately signed message for another terminal for deriving a ranking vector from the received message which again is the same function of the message (DATA) received and a cryptographic function known to both parties. Circuitry is provided, upon the determination of the ranking vector for generating successor one-way keyed signature sequence reference elements from each received signature element based solely upon the knowledge of said element as received and the ranking vector. This process is continued until all reference elements have been derived from the received signature at which point the reference elements so derived are compared with the reference elements previously exchanged between the parties and designated for use for this particular transaction. If the elements match, the identity of the user is unequivocally verified and the contents of the message are guaranteed.

24 Claims, 7 Drawing Figures

FIG. 1 SUBSCRIBER DATA NETWORK
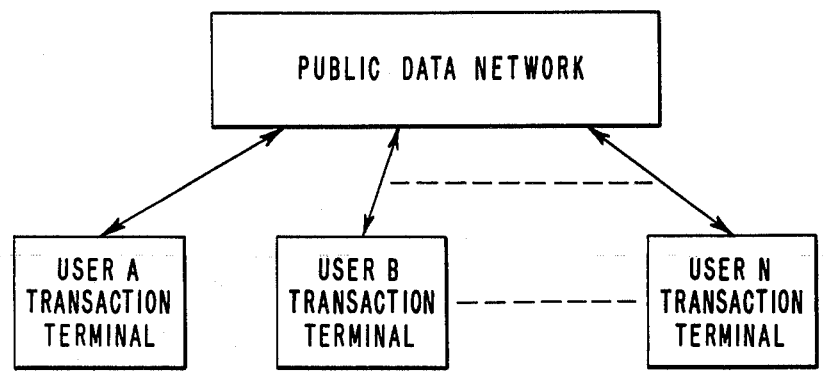
FIG. 2 TRANSACTION TERMINAL
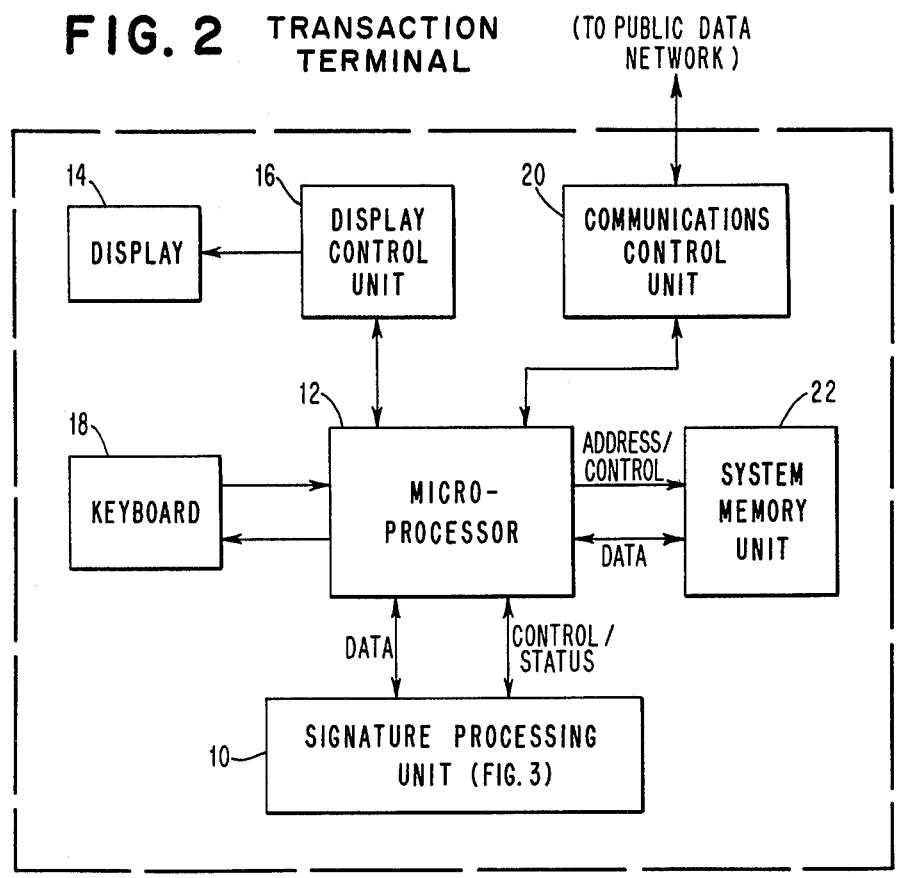

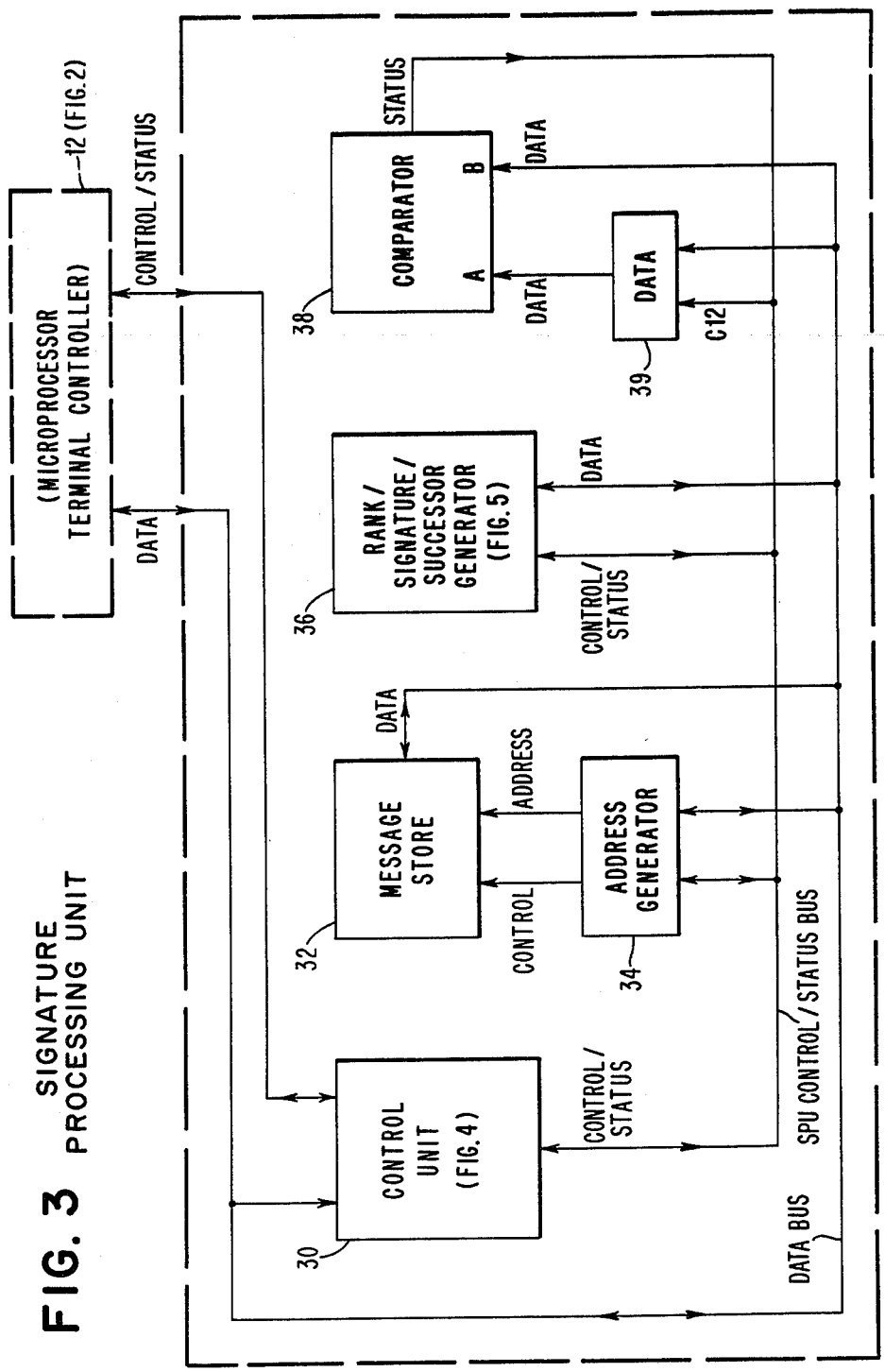
FIG. 3 SIGNATURE PROCESSING UNIT

FIG. 4 CONTROL UNIT, SPU
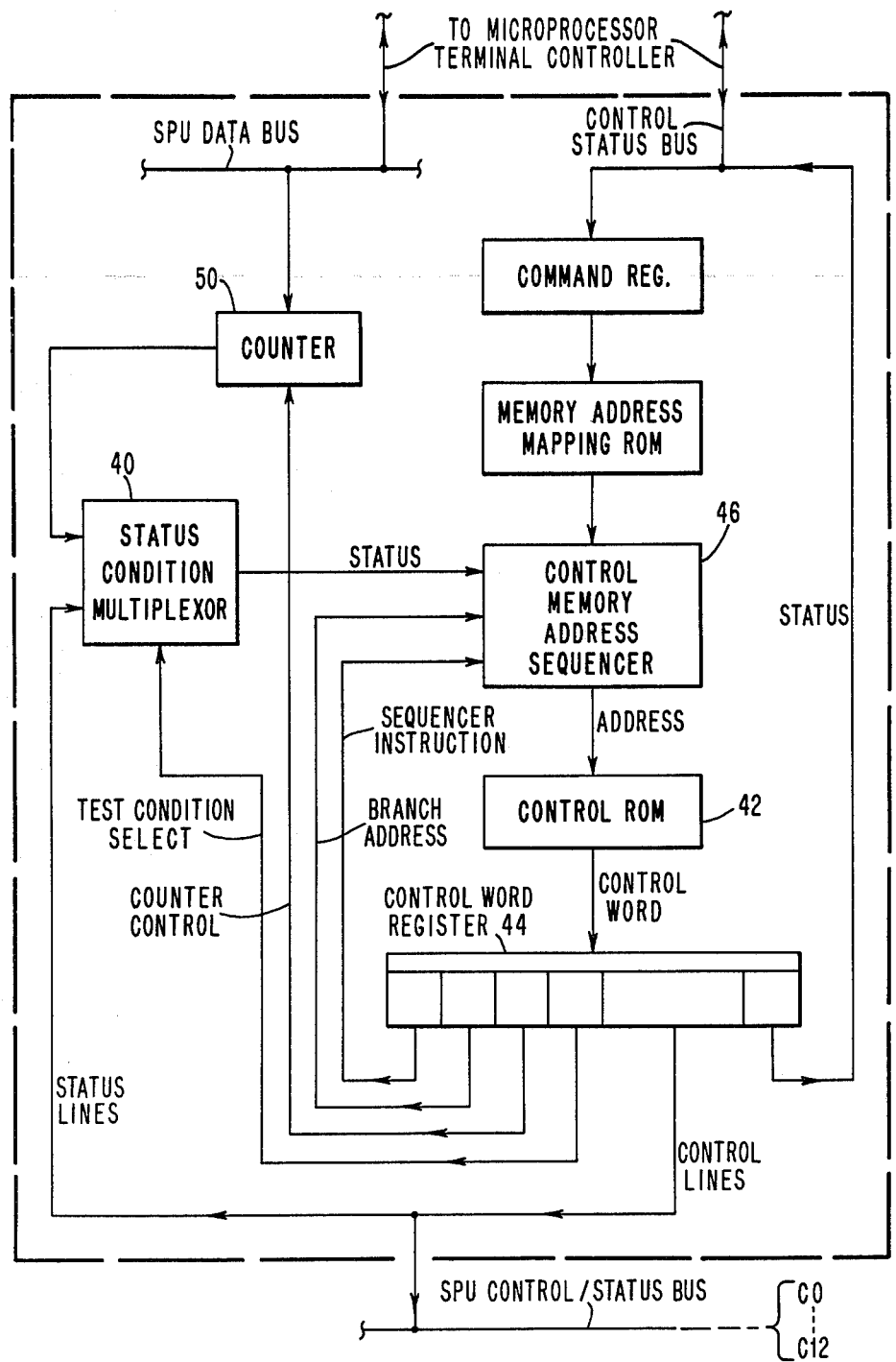

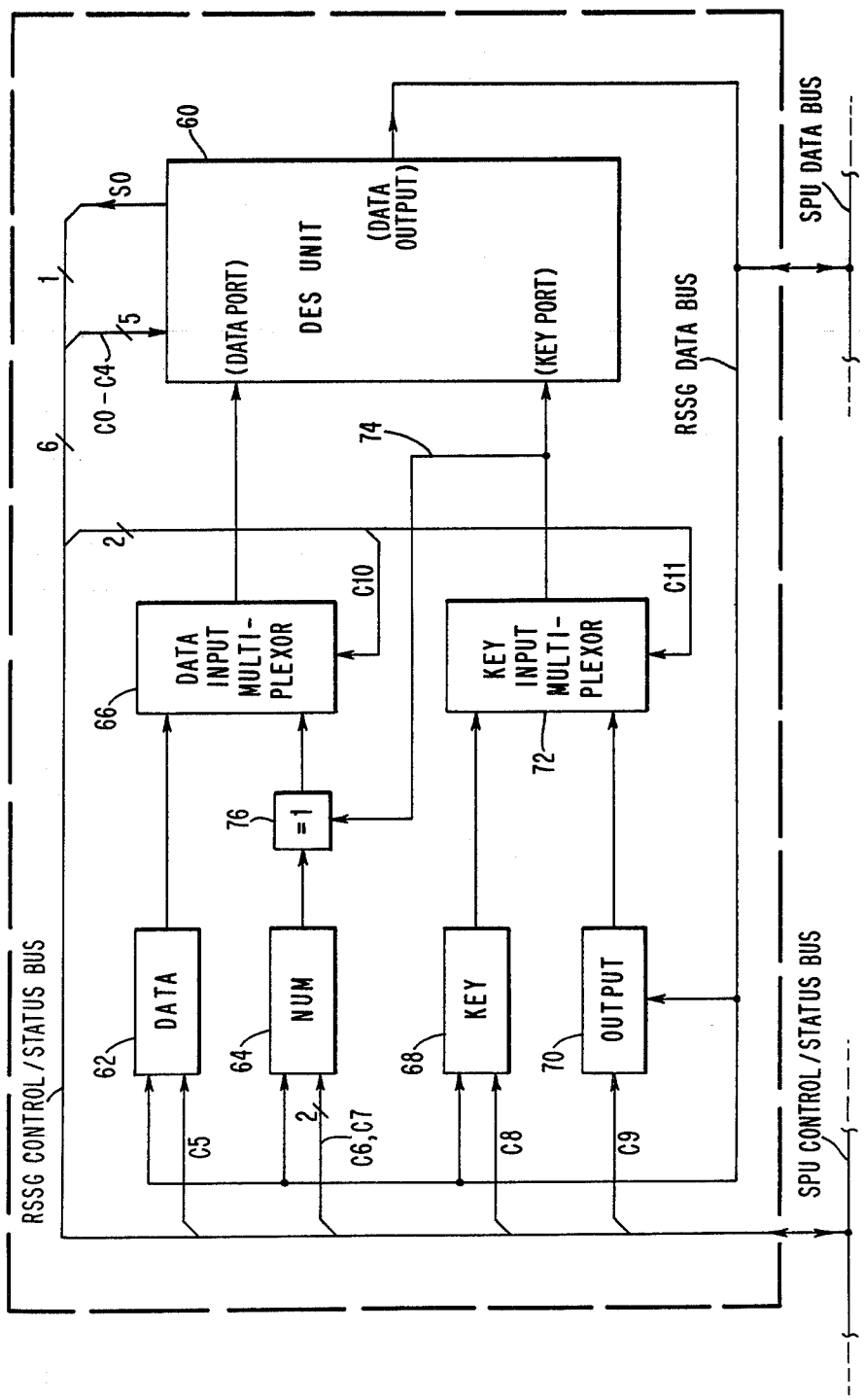
FIG. 5 RANK/SIGNATURE/SUCCESSOR GENERATOR (RSSG)

METHOD AND APPARATUS INCORPORATING A ONE-WAY SEQUENCE FOR TRANSACTION AND IDENTITY VERIFICATION

BACKGROUND OF THE INVENTION

1. Technical Field

The present invention relates to a high security communication system including a plurality of users or terminals connected to each other via a common communication link which is in turn connected to a Host CPU. By means of the present system it is possible for a User A (sender) to communicate a specific transaction to a User B (receiver) with an extremely high degree of integrity or confidence on the part of both users.

The high technology environment in which modern business operates affords many opportunities to do things that were impossible several decades ago. The advent of modern data processing, handling and high speed communication facilities allow business to be speedily transacted over hundreds or even thousands of miles. Where the business is routine and within a given business entity these modern data handling and communication tools may be utilized with great efficiency. However, there are still many areas of business activity which are still performed by old fashioned time consuming methods. An area which has been bypassed by modern technology is that of contracts between two business entities wherein two parties agree to enter into a very specific venture and are subsequently legally obligated to perform their relative duties required of the venture. Such a venture might simply involve the purchase of a piece of real property, the purchase or sale of stocks or commodities (especially where time is critical) or other ventures of an even more complicated nature.

Basically the two parties wish to enter into a contract which is usually consummated by both parties agreeing on the terms of a written document and personally signing same. The terms of the contract constitute an agreement as to what is to be done and the signatures insure each party that the other party is legally obligated to perform the contract.

Today this function is accomplished either by both parties meeting to agree upon terms and sign the document or the same process is accomplished by an appropriate exchange of documents via the mail. In the case where the parties meet and each sign in front of the other forgery is no problem, however with mail communications a forged signature could occur.

To conduct a basic contractual transaction utilizing modern communication and data handling facilities a number of threats to the integrity of such a transaction exist. In the following discussion the transaction message or data would constitute the terms of the contractural agreement and the users (sender and receiver) are the contracting parties.

The first threat is reneging, wherein the sender engages in a transaction with a receiver sending data which he may subsequently attempt to disown. Thus, the receiver must know with certainty that the sender sent the specific message which fact may be proven subsequently.

A second possible threat to such a system is forgery, wherein the receiver may allege that he received a message which in fact is a fabrication, thus, it must be possible for the sender to prove that the supposed message was in fact a forgery.

A third threat is similar to forgery, namely that of alteration, wherein the receiver might alter the message in a material way which would do some financial or other harm to the sender. Thus, any alteration of such a message must be identifiable by the alleged sender.

A still further threat is where a sender or other person, by penetrating the communication system, would attempt to fool a receiver into accepting a transaction as valid from some sender by manipulation of the operating system, such as by eavesdropping and the capture and resending of stale messages of the fabrication of "approval" signals from the CPU, etc. The system must thereby guarantee B that such penetration is not possible.

A final threat is masquerading, wherein a user on the system would attempt to masquerade as a different user to a third party. This would normally be done by means of a combination of the above threats.

In the herein disclosed verification/communication system it must be assumed that all users are linked to the host telecommunication system in common and that their messages are enciphered by a common encipherment process. Accordingly, the integrity of the communication's security, or lack of it, will play no role in the verification of transactions.

As stated previously, there are many potential uses for such a high integrity communication system in the modern business community. Potential applications are in the area of stock market transactions carried out over the communications system, automatic banking transactions, electronic mail and/or any other system in which digitilized messages are sent and received over public communications channels and wherein the integrity of both the messages and the originators must be absolutely guaranteed.

It is accordingly a primary object of the present invention to provide such a high security communication system wherein both the transaction content and the authenticity of senders may be unequivocally determined and wherein all of the above enumerated threats may be substantially eliminated.

It is a further object to provide such a system utilizing readily available communcations and computational hardware organized and operated in the manner set forth herein to produce such a system.

It is a still further object to provide such a system whereby the required integrity may be guaranteed by a transaction protocol utilizing a one-way signature generation sequence.

2. Description of the Prior Art

The following publications all relate to various types of electronic or digital signature system generally using various types of approaches to achieve data and/or message integrity. The systems disclosed in these publications differ considerably in both approach and results to the system disclosed herein. (1) M. O. Rabin, "Signature and Certification by Coding," IBM Technical Disclosure Bulletin, Vol. 20, No. 8, pp. 3337–8, (January 1978). (2) W. Diffie, M. Hellman, "New Directions in Cryptography," IEEE Trans. on Information Theory (November 1976). (3) R. L. Rivest, A. Shamir and L. Adleman, "On Digital Signatures and Public-Key Crypto-Systems," M.I.T. Laboratory for Computer Science Report, MIT/LCS/TM-82 (April 1977).

The following copending applications both describe high integrity communication systems utilizing state-of-the-art encryption devices and having the capability of securing the system against the previously enumerated threats. However, the system in both of these patent applications utilize essentially a two-way communication protocol. (1) Application Ser. No. 053,589 of A. G. Konheim filed June 29, 1979 entitled; "A Method and Apparatus for Transaction and Identity Verification", now U.S. Pat. No. 4,264,782 and (2) Application Ser. No. 165,455 of W. G. Bouricius et al filed July 2, 1980 entitled "A High Security System for Electronic Signature Verification", now U.S. Pat. No. 4,326,098.

BRIEF DESCRIPTION OF THE DRAWINGS

FIG. 1 is a diagrammatic representation of a typical described data network shown in a plurality of USERS connected to a common public data network illustrating the overall environment of the present invention.

FIG. 2 is a functional block diagram of a typical transaction terminal suitable for use in practicing the present invention.

FIG. 3 is a functional block diagram of a Signature Processing Unit (SPU).

FIG. 4 comprises a combination functional block and logical mathematic diagram of the control unit which controls the operation of the Signature Processing Unit.

FIG. 5 acts as a combination functional block and logical schematic diagram of a Rank/Signature/Successor Generator (RSSG) of the Signature Processing Unit of FIG. 3.

BRIEF DESCRIPTION OF THE TABLES

Figure 6:
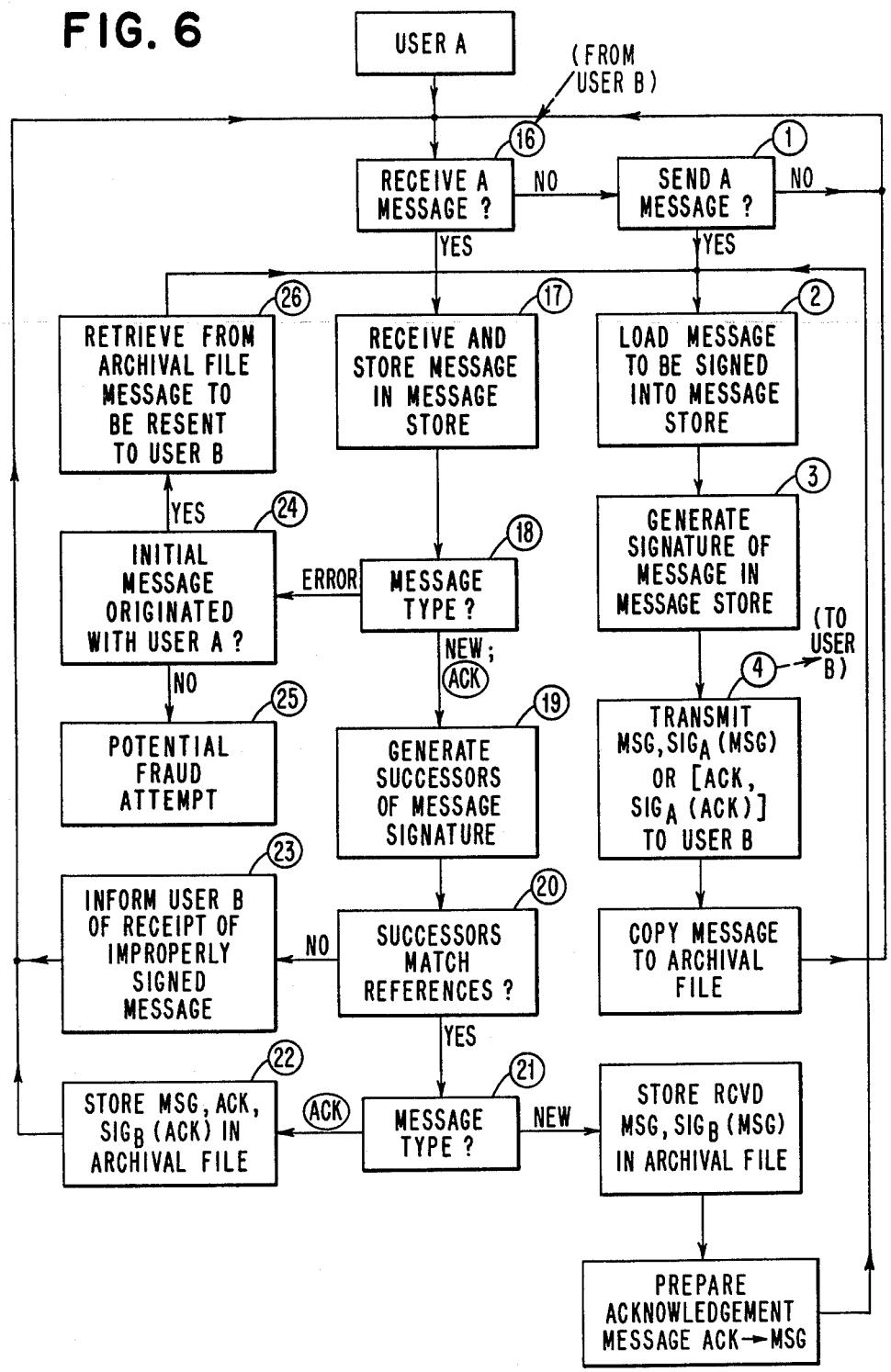
FIGS. 6 and 7 comprise identical flow charts for two different Users illustrating the detailed operation of the present system in performing a complete message transaction in accordance with the teachings of the present invention. By the use of two functionally identical flowcharts, the data flow and functional operations performed for a single transaction are clearly illustrated.

Table 1 diagrammatically illustrates the generation of the ranking family using a step coding function.

Table 2 illustrates the form of a typical signature contract (for a single transaction) which would be exchanged between two users in such a transaction verification system.

Tables 3(a) through 3(f) comprise a series of tables illustrating the operation of the present invention by means of a greatly simplified example using parameters (r and s) for the protocol of a much lower value than would normally be utilized for reasons of security.

Table 4(a) is illustrative of a typical signature contract which would be exchanged between two Users (A and B) of the system set forth and described as the preferred embodiment of the invention.

Table 4(b) illustrates the generation of a particular Keyed Signature Sequence, the generation of a particular signature digit and the generation of successor signature elements to produce a particular reference signature as required by the protocol of Table 4(a).

Table 5 comprises a tabulation of control signals and their respective functions which control the Rank/Signature/Successor Generator (RSSG) of FIG. 5.

SUMMARY OF THE INVENTION

The objectives of the present invention are accomplished in general by a transaction verification system where USER A signs the transaction in which the data DATA is sent to USER B by appending to the data a sequence of s signatures $$DATA, SIG_0, SIG_1, \ldots, SIG_{s-1}$$

The $t^{th}$ signature $SIG_t$ with $t = 0, 1, \ldots, s-1$ is a specific data-dependent term in one of a plurality of keyed-signature-sequences $$KSS_0(k_A,0), KSS_1(k_A,0), \ldots, KSS_r(k_A,0)$$

$$KSS_0(k_A,1), KSS_1(k_A,1), \ldots, KSS_r(k_A,1)$$

$$\ldots$$

The $j^{th}$ keyed-signature-sequence with $j = 0, 1, \ldots$ $$KSS_0(k_A,j), KSS_1(k_A,j), \ldots, KSS_r(k_A,j)$$

is the sequence of numbers in which:
(i) the initial element $$KSS_0(k_A,j)$$

depends upon both
- j, the index which distinguishes different keyed-signature-sequences, and
- - USER A's (secret) key $k_A$ by the rule $$KSS_0(k_A,j) = DES\{k_A, j \oplus k_A\}$$

(ii) succeeding elements in the sequence satisfy a recurrence of the form $$KSS_i(k_A,j) = f(KSS_{i-1}(k_A,j),j)$$

for $i = 1, 2, \ldots, r$ in which f is a known function specified by the system protocol.

The successors of any term $KSS_i(K_A,j)$ $$KSS_{i+1}(k_A,j), KSS_{i+2}(k_A,j), \ldots, KSS_r(k_A,j)$$

can be calculated without use of USER A's key $k_A$.

The $r^{th}$ or final term $KSS_r(k_A,j)$ is called the $j^{th}$ reference signature and is listed in a contract previously exchanged by USER A and USER B.

Each transaction between USER A and USER B is assigned a transaction number TN. Both users maintain a record of the current value of TN and use TN to determine by table look-up (Table 3(a)) the indices $NUM_0, NUM_1, \ldots, NUM_{s-1}$ of the keyed-signature-sequences $$KSS_0(k_A,NUM_0), KSS_1(k_A,NUM_0), \ldots, KSS_r(k_A,NUM_0)$$

$$KSS_0(k_A,NUM_1), KSS_1(k_A,NUM_1), \ldots, KSS_r(k_A,NUM_1)$$

$$\ldots$$

$$KSS_0(k_A,NUM_{s-1}), KSS_1(k_A,NUM_{s-1}), \ldots, KSS_r(k_A,NUM_{s-1})$$

which will be used to derive the signatures in the $TH^{th}$ transaction. The specific term in the $NUM_t^{th}$ keyed-signature-sequence $$KSS_0(k_A,NUM_t), KSS_1(k_A,NUM_t), \ldots, KSS_r(k_A,NUM_t)$$

which constitutes the $t^{th}$ signature $SIG_t$ in the $TN^{th}$ transaction is made by a data-dependent process herein called ranking. Both USER A and USER B may independently determine the rank of DATA. The rank of DATA is a sequence of s numbers $$p_0, p_1, \ldots, p_{s-1}$$

each term of which is a data-determined integer having one of the values $0, 1, \ldots, r-1$.

SIGNING A TRANSACTION

To sign DATA in the $TN^{th}$ transaction, USER A is required by the protocol to append to DATA the s signatures $$SIG_0 = KSS_{p0}(k_A, NUM_0)$$

$$SIG_1 = KSS_{p1}(k_A, NUM_1)$$

...
...
...

$$SIG_{s-1} = KSS_{ps-1}(k_A, NUM_{s-1})$$

To sign the transaction in which USER A sends data DATA to USER B, the following steps are follows:

Sign (i) the transaction number TN and a table look-up (Table 3(a)) specifies the indices $$NUM_0, NUM_1, \ldots, NUM_{s-1}$$

of the s keyed-signature-sequences $$KSS_0(k_A, NUM_0), KSS_1(k_A, NUM_0), \ldots, KSS_r(k_A, NUM_0)$$

$$KSS_0(k_A, NUM_1), KSS_1(k_A, NUM_1), \ldots, KSS_r(k_A, NUM_1)$$

...
...
...

$$KSS_0(k_A, NUM_s), KSS_1(k_A, NUM_s), \ldots, KSS_r(k_A, NUM_s)$$

which will supply the signatures for the $TN^{th}$ transaction between USER A and USER B.

Sign (ii) USER A calculates the rank $$p_0, p_1, \ldots, p_{s-1}$$

of DATA

Sign (iii) USER A signs the data by appending to DATA the s signatures $$SIG_0 = KSS_{p0}(k_A, NUM_0)$$

$$SIG_1 = KSS_{p1}(k_A, NUM_1)$$

...
...
...

$$SIG_{s-1} = KSS_{ps}(k_A, NUM_{s-1})$$

VERIFYING A SIGNED TRANSACTION

When the $TN^{th}$ transaction, purportedly signed by USER A, $$DATA, SIG_0, SIG_1, \ldots, SIG_{s-1}$$

is received, USER B proceeds to verify the signatures by the following steps:

Verify (i) The transaction number TN and a table look-up (Table 3(a)) specifies the indices $$NUM_0, NUM_1, \ldots, NUM_{s-1}$$

of the s keyed-signature-sequences $$KSS_0(k_A, NUM_0), KSS_1(k_A, NUM_0), \ldots, KSS_r(k_A, NUM_0)$$

$$KSS_0(k_A, NUM_1), KSS_1(k_A, NUM_1), \ldots, KSS_r(k_A, NUM_1)$$

...
...
...

$$KSS_0(k_A, NUM_{s-1}), KSS_1(k_A, NUM_{s-1}), \ldots, KSS_r(k_A, NUM_{s-1})$$

presumptively used by USER A to sign the DATA.

Verify (ii) the rank of the DATA $$p_0, p_1, \ldots, p_{s-1}$$

is calculated by USER B.

In a properly signed tranactions the s signatures have the values $$SIG_0 = KSS_{p0}(k_A, NUM_0)$$

$$SIG_1 = KSS_{p1}(k_A, NUM_1)$$

...
...
...

$$SIG_{s-1} = KSS_{ps-1}(k_A, NUM_s)$$

Verify (iii) USER B verifies the correctness of the received signatures by calculating

- the $r\text{-}p_0{}^{th}$ successor of $SIG_0$
- the $r\text{-}p_1{}^{th}$ successor of $SIG_1$
- ...
- ...
- ...
- the $r\text{-}p_{s-1}{}^{th}$ successor of $SIG_s$ and comparing these s successors with the reference signatures in the previously exchanged contract.

The transaction is accepted by USER B if and only if there is complete agreement in the comparison.

ACKNOWLEDGEMENT

The verification process is made symmetric by requiring USER B to acknowledge the receipt of the message to USER A; the acknowledgement message is signed (by USER B) and verified (by USER A) employing the same protocol as above except that the acknowledgement phase uses the (secret) key $k_B$ of USER B instead of the (secret) key $k_A$ (of USER A).

The transaction verification protocol may be performed on the small special purpose computer described or could be performed less efficiently by suitably programming a general purpose computer necessarily equipped to perform the DES encryption method.

As will be apparent from the "Mathematical Basis of the Invention" discussion which follows, a number of different methods may be utilized for generating the individual keyed signature sequences. It is, of course, necessary for all users of the system to know the particular method utilized so that the successors can be appropriately generated. The common concept which must exist in all of the methods is that of the one-way sequence wherein the output of one element of a given KSS computation is the input Key to the succeeding operation.

A number of examples of different methods of accomplishing the keyed signature sequences is set forth in the following "Mathematical Basis of the Invention" section.

Similarly, there are many ways in which the ranking family may be computed. The primary requisite is that it be a sufficiently complex function of the message itself that a casual observer or eavesdropper on the line should not be able to routinely extract same without a great deal of detailed knowledge of the system which would be ordinarily be possible. As stated previously an essential feature is that the ranking family or vector be computed by a method known to both users and by data known independently by both users at the time the verification operation is being performed. All of the disclosed methods do however, utilize the basic digital encryption system (DES) that previously has been emphasized as a basic building block of the hardware and realization of the system. However, in the compressed encoding mode of the presently disclosed embodiment the input message data is utilized as both the data input to the DES unit as well as the key input. It further utilizes key chaining of the output to the key input so that the final bytes of the output are a function of the entire input data.

Reference will now be made to a general discussion of the mathematical background of the invention and the mathematical consequences relating to system security when the principles of the present invention are applied to the realization of a transaction verification system. In the subsequent description it will be noted that a number of symbols and letters are utilized interchangeably to refer to a number of different parameters of the system. This is necessary due to the fact that the mathematical description is very complex and covers a great many possible situations. The particular symbols used in the following description are absolutely correct as used. However, they may not be totally consistent with the subsequent description of the preferred embodiment herein disclosed.

MATHEMATICAL BASIS OF THE INVENTION

1. Introduction

A community of subscribers, linked by a public data network, wish to engage in transactions of the form
  "USER A to USER B: Feb. 19, 1978 Buy 100 shares
  of . . . "
in such a manner that each party to the transaction can be confident of the integrity of the transaction. The class of threats we want to protect against include:

| | |
|---|---|
| reneging | A user refuses to honor a transaction or claims a different transaction was entered into. |
| forgery | A user fabricates a transaction from another user. |
| alteration | A user alters a valid transaction. |
| penetration of the operating system | A user attempts to make another user accept a bogus transaction by circumventing some protective features of the operating system. |
| masquerading | A user attempts to impersonate another user. |

2. What Does Transaction Verification Require?

USER A wishes to send the data block DATA to USER B. The requirements of a transaction verification scheme include:
  (i) USER A must provide with DATA some information, which we refer to as a signature. The signature SIG must be dependent upon both
    • the DATA, and
    • the USER A-key $k_A$, secret information, presumptively known only by USER A.
  (ii) A valid signature SIG (of DATA by USER A) must be essentially impossible for USER B to construct without the key $k_A$.

The encryption schemes used in this verification protocol involve the use of the DES algorithm and a secret key chosen from some finite set K. Accordingly, any verification system may be circumvented by exhaustive key trial; each key is tried until a key is found meeting some consistency condition. If the only method to find the secret key is equivalent to key trial and if the cardinality of K is sufficiently large, we regard the exhaustive trial as "essentially" impossible.
  (iii) USER B must have some procedure for verifying that DATA is correctly signed by USER A.
  (iv) USER A must have proof that USER B has received DATA.
  (v) The verification process must be unaffected by penetration of the host operating system.
  (vi) The verification process must have some time dependence to prevent the re-use of stale messages.

Verification schemes have been proposed in the past which meet some of these requirements. Of particular interest is the notion of a one-way function introduced in the previously referenced Diffie and Hellman article. To each user we associate a pair of mappings $$D_A, E_A : X \to X$$

on some domain X where $E_A$ represents encipherment and $D_A$ decipherment. While the relationship $D_A E_A = I$ is satisfied, an algorithmic description of $E_A$ does not effectively allow one to compute $D_A$. The functions $\{E_A\}$ are listed in a public directory. USER A then signs data DATA for USER B by sending USER B $$D_A(E_B(DATA))$$

which USER B may then read by applying the operator $D_B(E_A)$. One-way functions based upon the supposed "hard" problems
  (i) the factorization of an integer $n = pq$ which is the product of two "large" primes, and
  (ii) the knapsack problem.
have been constructed.

The present transaction verification method's or protocol's ability to protect transactions rests on the existence of a strong encipherment algorithm. The protocol assumes that each user has a (secret) key. In summary, USER A transmits to USER B data concatenated with a number of signatures. The $i^{th}$-signature is a specific DATA-deteremined term in USER A's $i^{th}$-keyed signature-sequence $$KSS[k_A] = \{KSS_{t,i}[k_A,i]: 0 \leq t < \infty\}$$

the position being determined by the data through a protocol-defined ranking family. The terms $KSS[k_A,i]$ in the keyed-signature-sequence satisfy a recurrence of the form $$KSS_t[k_A,i] = f_i(KSS_{t-1}[k_A,i])$$

where $f_i$ is a function whose inverse image(s) may not be effectively computed and $KSS_0[k_A,i]$ depends upon USER A's secret key. Note that the successors of $KSS_t[k_A,i]$ may be calculated without USER A's key. The sequence $\{KSS_t[k_A,i]\}$ is therefore a one-way sequence; any user can determine the successors of a term while knowledge of $k_A$ is required to determine a predecessor. The element $KSS_r[k_A,i]$ is called the reference signature of $KSS[k_A,i]$ and is listed in a (USER A, USER B)-Contract exchanged at the start of the protocol. The recipient of the transaction USER B checks that the transaction is properly signed by computing the reference signatures from the received signatures and comparing them with the contract entry. The details of this protocol follow.

3. SIGNATURE SEQUENCES

The following notation is introduced:

$$\{0,1\}^n = \{x = (x_0, x_1, \ldots, x_{n-1}): x_i = 0 \text{ or } 1, 0 \leq i < n\}$$

$$Z_m = \{0, 1, \ldots, m-1\}$$

$|A|$ = the cardinality of (the set) A
A family of mappings $$\{\lambda_j : 1 \leq j < \infty\}$$

$$\lambda_j : \{0,1\}^{64j} \to Z_m$$

is called a ranking family and $$\rho(x) = \lambda_j(x) \text{ if } x \in \{0,1\}^{64j}$$

is the rank of x. It is desired that $\{\lambda_j\}$ be uniformly distributed in the sense that $$|\{x \in \{0,1\}^{64j}: \lambda_j(x) = a\}| = |\lambda_j^{-1}\{k\}| \approx 2^{64j} \div m$$
$$0 \leq a < m$$

Thus if $X_1$ and $X_2$ are independent and identically distributed random variables uniformly distributed on $\{0,1\}^{64j}$ $$Pr\{\rho(X_t) = a_t, t = 1,2\} \approx (1/m)^2 \{a_t\} \subseteq Z_m$$

where $Pr\{\ldots\}$ means: "the probability that the condition $\{\ldots\}$ within the braces holds.
When $m = r^s$, we write the base r representation of $\rho(X_t)$ $$\rho(X_t) = (\rho(X_t,0), \rho(X_t,1), \ldots, \rho(X_t,s-1))$$
$$0 \leq \rho(DATA,t) < r \quad 0 \leq t < s$$

It follows that $$Pr\rho(X_1,j) \leq \rho(X_2,j), 0 \leq j < s\} \approx ((r+1)/2r)^s$$

DES will denote the NBS data encryption standard. DES is a mapping $$DES: \{0,1\}^{56} \times \{0,1\}^{64} \to \{0,1\}^{64}$$

$$DES: (k,x) \to DES\{k,x\}$$

where k is the key and x is the plaintext block. We will also write $DES\{k,x\}$ if $k \in \{0,1\}^{64}$ meaning by this the encipherment of x by the key k' obtained from k by ignoring the 8 parity check bits in k.

DES can be extended to a mapping on $\{0,1\}^{64j}$; if $$x = (x_1, x_2, \ldots, x_j) \in \{0,1\}^{64j} \quad x_t \in \{0,1\}^{64} \quad 1 \leq t \leq j$$

then the chained encipherment of x with the key k by DES $$DESCHN: x = (x_1, x_2, \ldots, x_j) \to y = (y_1, y_2, \ldots, y_j)$$

is defined by the statements $$y_t = DES\{k, x_t \oplus y_{t-1}\} \quad 1 \leq t \leq j \quad y_0 = 0$$

The compressed encoding of (x,m) by DES $$DESCMP\{x,m\} = y \in \{0,1\}^{64}$$

is defined by the statements $$DES\{x_t, y_{t-1}\} = y_t \quad 1 \leq t \leq r \quad y_0 = m \quad y = y_r$$

A keyed-signature-sequence is a rule KSS $$KSS: \{0,1\}^{64} \times \{0,1\}^{64} \to \{0,1\}^{64} \times \{0,1\}^{64} \times \ldots \times \{0,1\}^{64} \times \ldots$$

associating with a pair of vectors KEY, NUM in $\{0,1\}^{64}$ a sequence $$KSS_0[KEY,NUM], KSS_1[KEY,NUM], \ldots$$
$$KSS_t[KEY,NUM] \in \{0,1\}^{64}$$

such that $$KSS_t[KSS_s[KEY,NUM],NUM] = KSS_{s+t}[KEY,NUM]$$

The successors of $KSS_t[KEY,NUM]$ is the sequence $$KSS_{t+1}[KEY,NUM], KSS_{t+2}[KEY,NUM], \ldots$$

while the predecessors of $KSS_t[KEY,NUM]$ is the sequence $$KSS_0[KEY,NUM], KSS_1[KEY,NUM], \ldots, KSS_{t-1}[KEY,NUM]$$

Note that the successor of $KSS_t[KEY,NUM]$ may be calculated from (i) $KSS_t[KEY,NUM]$, and
(ii) NUM The above section explains the following functional relationship; "t" successive applications of the rule KSS applied to the result of "s" successive applications of the rule KSS gives the same result as applying in the rule KSS "s+t" times to the original two vectors, i.e., to the key KEY and to NUM.

There are several realizations of ranking families and keyed-signature-sequences.

Example 3.1: Ranking Family by Chaining

If $$x=(x_1,x_2,\ldots,x_j)\ x_i\epsilon\{0,1\}^{64}\ (1\leq i\leq j)$$

$$DES{:}x=(x_1,x_2,\ldots,x_j)\to y=(y_1,y_2,\ldots,y_j)$$

$$y_i=DES\{k,x_i\oplus y_{i-1}\}\ 1\leq i\leq j\ y_0=0$$

we define $$\lambda_j(x)=||y_j||(modulo\ m)$$

where $||x||$ is the integer in $\{0,1,\ldots,2^{64}-1\}$ whose base 2 representation is $x$.

It is easy to show that the mapping $$x\to y_j$$

is $2^{64(j-1)}$ to one and hence $\lambda_j(x)$ has the required distributional properties.

Chaining suffers from a minor defect in this application; given $$z\epsilon\{0,1\}^{64}\ (x_1,x_2,\ldots,x_j)\epsilon\{0,1\}^{64j}$$

we may easily alter $x$ in just the final block $$x_j\to x_j'$$

so that the final 8 bytes of $$DESCHN\{(x_1,x_2,\ldots,x_j'),k\}$$

equal $z$. Of course modifying the final 8 byte block generally will not yield a sequence $x'$ which corresponds to the EBCDIC encoding of a "real" message, but this defect is nevertheless disturbing. To correct it we may use

Example 3.2: Ranking Family by Super-Encipherment

If $$x=(x_1,x_2,\ldots,x_j)\ x_i\epsilon\{0,1\}^{64}\ 1\leq i\leq j$$

we may super-encipher $x$ by $$y=DESCHN\{k,x\}$$

$$z=DESCHN\{k,y\}$$

and use the final ten bytes of $z$ to define the rank of $x$ $$\lambda_j(x)=||z_j||(modulo\ m).$$

To alter $z_j$ to $z_j'$ requires changing the entire plaintext block $x$. The $\{\lambda_j\}$ are uniformly distributed with super-encipherment.

Example 3.3: Ranking Family by Step Coding

If $$x=(x_0,x_1,\ldots,x_{n-1})\epsilon\{0,1\}^n\ n\geq 64$$

$$m_1,m_2,\ldots,m_j\ 0\leq m_i\leq n-64\ (1\leq i\leq j)$$

$$\{k_1,k_2,\ldots,k_j\}\subseteq\{0,1\}^{56}$$

the step encoding of $x$ by DES is defined by the statements $$y_i=DESSTEP\{x|k_1,k_2,\ldots,k_j,m_1,m_2,\ldots,m_j\}$$

$$y_i=(y_{i,0},y_{i,1},\ldots,y_{i,n-1})\epsilon\{0,1\}^n\ 1\leq i\leq j$$

$$y_i=\begin{cases}x[0,m_1),DES\{k_1,x[m_1,m_1+64)\}\ \text{if}\ i=1\\ y_{i-1}[0,m_i),DES\{k_i,y_{i-1}[m_i,m_i+64)\},y_{i-1}[m_i+64,n)\\ \text{if}\ 1<i\leq j\end{cases}$$

where $$u[i,j)=\begin{cases}(u_i,u_{i+1},\ldots,u_{j-1})\ \text{if}\ 0\leq i<j\leq n\\ \phi\ \text{otherwise}\end{cases}$$

and $$u=(u_0,u_1,\ldots,u_{n-1}).$$

In Table 1 we illustrate step coding for $$n=78, j=3$$

$$(m_1,m_2,m_3)=(0,15,9)$$

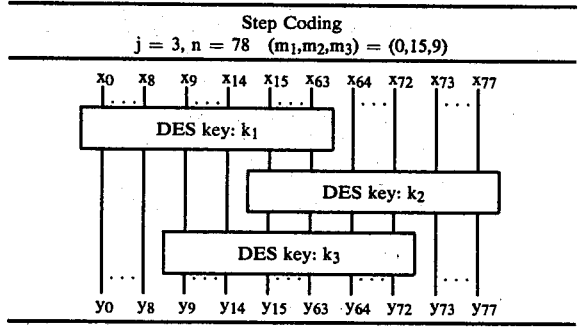

TABLE 1
Step Coding
j = 3, n = 78 (m₁,m₂,m₃) = (0,15,9)

We then set $$p(x)=||DESSTEP\{x|k_1,k_2,\ldots,k_j,m_1,m_2,\ldots,m_j\}||(modulo\ m)$$

For appropriate $\{m_i\}$ step coding has the required distributional properties; each component of the ciphertext is generally a complicated function of each component of the cleartext. There is no simple way to alter the final bits in the ciphertext.

Example 3.4: Ranking Family by Compressed Encoding

Let $y$ be the compressed encoding of the pair $(x,x)$ $$x=(x_1,x_2,\ldots,x_j)\ x_i\epsilon\{0,1\}^{64}\ 1\leq i\leq j$$

$$y=DESCMP\{x,x\}$$

and define $$\lambda(x)=||y||(modulo\ m)$$

We do not know whether the $\{\lambda_j\}$ are uniformly distributed, but it seems likely.

Example 3.5: Keyed-Signature-Sequence by Compressed Encoding

Define $$KSS_0[KEY, NUM] = DES\{KEY, NUM \oplus KEY\}$$

$$KSS_{t+1}[KEY, NUM] = DES\{KSS_t[KEY, NUM], NUM \oplus KSS_t[KEY, NUM]\}$$

$$0 \leq t < \infty$$

We take as hypothesis

Assumption 1: Given $x, y \in \{0,1\}^r$, the equation $$DES\{k, x \oplus k\} = y$$

requires approximately $2^{64}$ computational steps to solve for k.

Assumption 1 is consistent with our present understanding of the DES algorithm.

Corollary: The predecessors of $KSS_t[KEY, NUM]$ may not be effectively calculated without KEY.

In what follows we shall assume that
(i) $m = r^s$ and the existence of
(ii) a uniformly distributed ranking family,
(iii) a keyed-signature sequence satisfying the Corollary.

4. SIGNING A TRANSACTION

Each pair of users enter into a contract. USER A and USER B reveal their secret keys $k_A$ and $k_B$ to a trusted arbiter who will construct the contract (Table 2) containing the entries $$\{(i, KSS_r[k_A, i], KSS_r[k_B, i]) : 1 \leq i \leq N\}$$

TABLE 2

Table Of Keyed-Signatures

| NUM | Reference Signature Of | |
|---|---|---|
| | USER A | USER B |
| 1 | $KSS_r[k_A, 1]$ | $KSS_r[k_B, 1]$ |
| 2 | $KSS_r[k_A, 2]$ | $KSS_r[k_B, 2]$ |
| ... | ... | ... |
| N | $KSS_r[k_A, N]$ | $KSS_r[k_B, N]$ |

(USER A, USER B)-Contract

USER A, USER B and the arbiter each retain a copy of the contract.

To sign the $i^{th}$-transaction, in which DATA is sent from USER A to USER B, the following steps are followed:

Step 1: USER A calculates the s-dimensional vector $$\rho(DATA) = (\rho(DATA, 0), \rho(DATA, 1), \ldots, \rho(DATA, s-1)) \quad 0 \leq \rho(DATA, t)$$

and transmits to USER B the DATA concatenated with the s signatures $$SIG\{DATA, (i-1)s + t\} \quad 0 \leq t < s$$

In a valid transation the $t^{th}$ signature $SIG\{DATA, (i-1)s + t\}$ is the $\rho(DATA, t)^{th}$ term $$SIG\{DATA, (i-1)s + t\} = KSS_{\rho(DATA, t)}[k_A, (i-1)s + t]$$

in the keyed-signature sequence $$KSS_0[k_A, (i-1)s + t], KSS_1[k_A, (i-1)s + t], \ldots, KSS_{r-1}[k_A, (i-1)s + t]$$

Note that the ranking family determines which term is appended as the $t^{th}$ signature and that $KSS_r[k_A, (i-1)s + t]$ is the reference signature listed in the (USER A, USER B)-Contract (Table 2).

Step 2: User B computes rank of DATA and then the $r - \rho(DATA, t)^{th}$ successor of $SIG\{DATA, (i-1)s + t\}$ $$KSS_{r-\rho(DATA,t)+1}[SIG\{DATA, (i-1)s+t\}]$$

presumptively equal to $$KSS_r[k_A, (u-1)s + t]$$

USER B checks if these s computed successors match the s reference signatures in the (USER A, USER B)-Contract. USER B accepts DATA as properly signed if and only if these are identical.

Step 3: The roles of USER A and USER B are now reversed; USER B sends an acknowledgement message to USER A "USER B to USER A: I acknowledge receipt of your properly signed transaction DATA sent to me on Feb. 19, 1978"

The acknowledgement message is signed (by USER B) in the manner described in Step 1.

Step 4: The reference signatures in rows $(i-1)s + t$ with $0 \leq t < s$ in the (USER A, USER B)-Contract are used to sign only one transaction.

5. DISPUTES

Besides participating in the construction (and registration) of the (USER A, USER B)-Contract, the arbiter ajudicates disputes. We consider two types of disputes.

Case 5.1: USER B claims DATA was sent by USER A on the $i^{th}$-transaction.

USER B will be required to produce for the arbiter the s signature keys $$SIG\{DATA, (i-1)s + t\} \quad 0 \leq t < s$$

which are presumptively equal to $$KSS_{92(DATA,t)}[k_A, (i-1)s + t] \quad 0 \leq t < s$$

The arbiter upholds the claim of USER B, thereby forcing USER A to honor the transaction DATA, provided

- the above signature keys yield as successors the entries $$KSS_r[k_A, (i-1)s + t] \quad 0 \leq t < s$$

- and USER A cannot produce a transaction DATA' which satisfies $$\rho(DATA', t) \leq \rho(DATA, t) \quad 0 \leq t < s$$

Otherwise, the arbiter will decide that USER B does not have a legitimate claim.

Case 5.2: USER A claims that there was a valid transaction DATA with USER B.

USER A will be required to supply the arbiter the s signature keys for the acknowledgement message. USER A now plays the role of USER B as in Case 5.1.

6. Are Such Signed Transactions Protected?

Can either party circumvent this transaction protocol to force the other into accepting a transaction which may be subsequently successfully disowned by the other party?

Given s rank values $$\{\rho(DATA',t):0 > t < s\}$$

can we find DATA such that $$\rho(DATA',t) \leq \rho(DATA,t) \ 0 \leq t < s?$$

The probability of randomly chosen messages (DATA', DATA) satisfying the above condition is approximately $$((r+1)/2r)^s \approx 2^{-2}$$

for sufficiently large r. Moreover the messages that will be accepted by a transaction system will have to meet certain minimal requirements; for example, be readable English language text. Thus the probability that $$\rho(DATA',t) \leq \rho(DATA,t) \ 0 \leq t < s$$

may be made sufficiently small for suitable s.

Case 6.1: Reneging

If USER A engages in a transaction DATA which is accepted by USER B as a properly signed transaction, can USER A later successfully renege to DATA'? To renege, USER A must (i) deliver to USER B s signatures $$SIG\{DATA,(i-1)s+t\} \ 0 \leq s < t$$

whose successors agree with the entries in the (USER A,USER B)-Contract.

(ii) Be able to produce for the arbiter data DATA' which satisfies $$\rho(DATA',t) \leq \rho(DATA,t) \ 0 \leq t < s$$

USER A might then claim that DATA' represents the actual transaction with USER B and that USER B obtained the signatures for DATA from those of DATA'.

If such a pair of messages (DATA,DATA') exists, then the arbiter will rule for USER A in the dispute; thus allowing USER A to renege on DATA in favor of DATA'. The probability of finding (DATA',DATA) is approximately $((r+1)/2r)^s$ and hence for suitable s may be made sufficiently small.

Case 6.2: Forgery/Alteration

If USER B is to forge a transaction DATA, which will be upheld by the arbiter, it is necessary that USER B produce s signatures $$SIG\{DATA,(i-1)s+t\} \ 0 \leq t < s$$

whose successors $$KSS_{r-\rho(DATA,t)}[SIG\{DATA,(i-1)s+t\},(i-1)s+t]0 \leq t < s$$

are identical to the reference signatures in the (USER A,USER B)-Contract.

This requires USER B to find a predecessor in the keyed-signature-sequence which we have hypothesized as effectively impossible. The alteration of DATA' to DATA places USER B in the role of a reneger as in Case 6.1.

7. Additional Features

1. It is not necessary to list all reference signatures in the (USER A,USER B)-Contract. Instead we need only record the compressed encoding of blocks of s reference signatures. In preparing the (USER A,USER B)-Compressed Contract, the values $$\{KSS_r[k_{A,}(i-1)s+t]:0 \leq t < s\}$$

and $$\{KSS_r[k_{B,}(i-1)s+t]:0 \leq t < s\}$$

are calculated and their compressed encodings are then derived. These final 8 byte compressed encodings are listed in the (USER A,USER B) Compressed Contract. In Steps 1 and 2 of Section 4, USER A and USER B transmit the signatures $$\{KSS_{\rho(DATA,t)}[k_{A,}(i-1)s+t]:0 \leq t < s\}$$

and $$\{KSS_{\rho(DATA,t)}[k_{B,}(i-1)s+t]:0 \leq t < s\}$$

The reference signatures are calculated from the received signatures, compressed encoded and compared with the entries in the contract.

2. We assume that each transaction is dated (and perhaps time-stamped). Thus an opponent cannot effectively use information from the valid transaction "USER A to USER B on Feb. 28, 1978: Buy 100 shares ..."

to help in forging the transaction

"USER A to USER B on Mar. 1, 1978: Buy 100 shares ..."

3. USER A only requires a single key $k_A$ in exchanging contracts with system participants. For this purpose we modify the (USER A,USER B) Contract by enciphering by $k_a \oplus \sigma_A$ (resp. $k_B \oplus \sigma_B$) where $\sigma_A$ (resp. $\sigma_B$) is some (non secret) vector depending upon the "identity" of USER A (resp. USER B).

4. Any transaction vertification system in which reference is made to a contract containing a "large" amount of data must be stored in the system and hence protected against fraudulent modification. We can insist that the contract reside is read-only memory but this evades the issue.

There are many ways to protect the contract. One solution is as follows:

(i) each user is provided with a key card upon which is magnetically recorded
  - a key $k_{A,1}$
  - a status vector STATUS.

(ii) The key $k_A$ of USER A is the sum $$k_A = k_{A,1} \oplus k_{A,2}$$

of the card entry and a memorized key $k_{A,2}$ which is entered at the time of a transaction.

(iii) The arbiter prepares two versions of the (USER A,USER B)-Contract to be stored in the system. The rows of USER A's copy are permuted and the contract (and permutation) are stored enciphered under $k_A$. STATUS is the compressed encoding of an array (USER A-RECORD) consisting of rows with the format User name, Number of previous transactions with us (USER A-RECORD) is stored in the system either enciphered (or in the clear) while STATUS, the compressed encoding of (USER A-RECORD), is recorded on the card. The array (USER A-RECORD) is updated at USER A's terminal after each transaction. The important point is that some information not resident in the system is available to allow USER A to detect improper changes of the stored contract.

5. The values of the ranking family parameters r and s effect the probability of success of the actions—reneging, alteration, forgery. Increasing r and s decreases the probability of success. If $r=10$, $s=20$ the probability of success for reneging/alteration/forgery is approximately $10^{-6}$.

DEFINITION OF TERMS USED IN EXAMPLES AND THE DISCLOSED EMBODIMENT

It is to be clearly understood that the expression keyed-signature-sequence as used in the present specification and claims is a data sequence obtained by using the DES algorithm to determine the initial element $$KSS_0(k_A,j) = DES\{k_A, j \oplus k_A\}$$

as a function of the user's (secret) key (i.e. $k_A$ for USER A) and an index j known to both parties specifying the particular keyed-signature-sequence. Furthermore, an algorithm f known by both parties to the transaction $$KSS_i(k_A,j) = f(KSS_{i-1}(k_A,j),j)$$

is used to produce successors to the initial element $$KSS_0(k_A,j)$$

whereby the successor $KSS_i(k_A,j)$ of the $(i-1)^{st}$ element $KSS_{i-1}(k_A,j)$ may be computed without the use of USER A's (secret) key $k_A$.

The $r^{th}$ or final element $KSS_r(k_A,i)$ in the $j^{th}$ keyed-signature-sequence is the $j^{th}$ reference signature and is recorded in the contract exchanged by USER A and USER B. In general, different values of $KSS_r(k_A,j)$ will result from different values of j. In the present embodiment the value $r=16$ is used since it is convenient to express in hexidecimal representation. The successor function f in the present embodiment is defined by $$KSS_i(k_A,j) = DES\{KSS_{i-1}(k_A,j), j \oplus KSS_{i-1}(k_A,j)\}$$

The rank of the data $$p_0, p_1, \ldots, p_{s-1}$$

contains as many terms s as there are individual signatures to be appended to the data. The rank may be independently calculated by each of the participants in the transaction and is specified by the transaction protocol. In the present embodiment $s=20$ and the rank results from the compressed encoding of the data.

SIGNING A TRANSACTION

To sign the $TN^{th}$ transaction, in which the sender (USER A) transmits DATA to the receiver (USER B), the following steps are followed:

Sign (i): USER B uses the current transaction number TN to determine by table look-up (Table 3(a)) the indices $$NUM_0, NUM_1, \ldots, NUM_{s-1}$$

of the keyed-signature-signatures $$KSS_0(k_A, NUM_0), KSS_1(k_A, NUM_0), \ldots, KSS_r(k_A, NUM_0)$$

$$KSS_0(k_A, NUM_1), KSS_1(k_A, NUM_1), \ldots, KSS_r(k_A, NUM_1)$$

$$\ldots$$
$$\ldots$$
$$\ldots$$

$$KSS_0(k_A, NUM_{s-1}), KSS_1(k_A, NUM_{s-1}), \ldots, KSS_r(k_A, NUM_{s-1})$$

Sign (ii): USER A computes the rank of DATA $$p_0, p_1, \ldots, p_{s-1}$$

Sign (iii) appends to DATA, the s signatures $$SIG_0 = KSS_{p_0}(k_A, NUM_0)$$

$$SIG_1 = KSS_{921}(k_A, NUM_1)$$

$$\ldots$$
$$\ldots$$
$$\ldots$$

$$SIG_{s-1} = KSS_{p_{s-1}}(k_A, NUM_{s-1})$$

VERIFYING A SIGNED TRANSACTION

Upon receipt of the signed transaction $$DATA, SIG_0, SIG_1, \ldots, SIG_{s-1}$$

USER B

Verify (i) Determines by table look-up (Table 3(a)) the indices $$NUM_0, NUM_1, \ldots, NUM_{s-1}$$

of the s keyed-signature-sequences $$KSS_0(k_A, NUM_0), KSS_1(k_A, NUM_0), \ldots, KSS_r(k_A, NUM_0)$$

$$KSS_0(k_A, NUM_1), KSS_1(k_A, NUM_1), \ldots, KSS_r(k_A, NUM_1)$$

$$\ldots$$
$$\ldots$$
$$\ldots$$

$$KSS_0(k_A, NUM_{s-1}), KSS_1(k_A, NUM_{s-1}), \ldots, KSS_r(k_A, NUM_{s-1})$$

which participated in signing the $TN^{th}$ transaction.
Verify (ii) USER B computes the rank of DATA $p_0, p_1, \ldots, p_{s-1}$ Verify (iii) Starting from the $t^{th}$ signature $SIG_t$, presumptively equal to $KSS_{p_t}(k_A, NUM_t)$ in a properly signed transaction, USER B derives the presumptive value of the reference signature $KSS_r(k_A, NUM_t)$ by applying the successor operation.

The s successors computed in Verify (iii) are compared to the reference signatures in the contract exchanged by USER A and USER B and the transaction is accepted by USER B if there is complete agreement.

Thus assuming that TN=6, s=20 and that the values $$NUM_0, NUM_1, \ldots NUM_{s-1}$$

are assigned consecutive values 0, 1, 2, ... as in Table (3a), USER B computes in Verify (i)

$NUM_0 = 120$ $NUM_1 = 121$

. . .
. . .
. . .

$NUM_{19} = 139$ since $NUM_0$ is the first element in the group beginning with number 120

$NUM_1$ is the second element in the group beginning with number 120

. . .
. . .
. . .

$NUM_{19}$ is the twentieth element in the group beginning with number 120

It will be apparent from the preceding discussion that the concept of a one-way keyed-signature-sequence combined with the concept of computing the rank of data provides together a very powerful and secure procedure for achieving the verification of transactions. It is also apparent that there are many ways in which the concepts of the present invention may be applied to a particular hardware or process environment. For the purposes of the herein disclosed preferred embodiment, the computations of both the ranking of the data and the keyed-signature-sequence will employ variants of the DES algorithm. The rank of data is determined by first computing the compressed encoding of the data and using the final or trailing $$s \times \log_2 r = 20 \times \log_2 16 = 20 \times 4 = 80$$

bits of the resulting ciphertext $(C_0, C_1, \ldots, C_{79})$ to determine the rank of the data $p_0 = (C_0, C_1, C_2, C_3)$ $p_1 = (C_4, C_5, C_6, C_7)$

. . .
. . .
. . .

$p_{19} = (C_{76}, C_{77}, C_{78}, C_{79})$ where the equality above means that the 4-bit number on the right is the base 2 representation of the decimal number on the left.

DESCRIPTION OF A SIMPLIFIED EXAMPLE

The underlying concepts of the present transaction verification system will now be explained with the aid of a simplified example using Tables (3a) to (3e) to show in detail just precisely what is done in each step of the verification process. Although in the herein disclosed embodiment r is chosen to be 16 and s=20, the values of r=4 and s=5 are utilized for reasons of simplicity in the present example. Thus five signatures $$SIG_0, SIG_1, \ldots, SIG_4$$

will be appended to the data DATA in the vertification process and the rank of DATA will be a sequence $$p_0, p_1, \ldots, p_4$$

of integers each of which assumes one of the values 0, 1, 2, 3. Of course, as previously indicated, much larger values for r and s are required for adequate security TABLE 3(a)

| (USER A, USER B)-Contract | | | | |
|---|---|---|---|---|
| Transaction Number | | | Reference Signature | |
| TN | t | $NUM_t$ | USER A | USER B |
| 1 | 0 | 0 | $KSS_4(k_A, 0)$ | $KSS_4(k_B, 0)$ |
| 1 | 1 | 1 | $KSS_4(k_A, 1)$ | $KSS_4(k_B, 1)$ |
| 1 | 2 | 2 | $KSS_4(k_A, 2)$ | $KSS_4(k_B, 2)$ |
| 1 | 3 | 3 | $KSS_4(k_A, 3)$ | $KSS_4(k_B, 3)$ |
| 1 | 4 | 4 | $KSS_4(k_A, 4)$ | $KSS_4(k_B, 4)$ |
| 2 | 0 | 5 | $KSS_4(k_A, 5)$ | $KSS_4(k_B, 5)$ |
| 2 | 1 | 6 | $KSS_4(k_A, 6)$ | $KSS_4(k_B, 6)$ |
| 2 | 2 | 7 | $KSS_4(k_A, 7)$ | $KSS_4(k_B, 7)$ |
| 2 | 3 | 8 | $KSS_4(k_A, 8)$ | $KSS_4(k_B, 8)$ |
| 2 | 4 | 9 | $KSS_4(k_A, 9)$ | $KSS_4(k_B, 9)$ |
| 3 | 0 | 10 | $KSS_4(k_A, 10)$ | $KSS_4(k_B, 10)$ |
| 3 | 1 | 11 | $KSS_4(k_A, 11)$ | $KSS_4(k_B, 11)$ |
| 3 | 2 | 12 | $KSS_4(k_A, 12)$ | $KSS_4(k_B, 12)$ |
| 3 | 3 | 13 | $KSS_4(k_A, 13)$ | $KSS_4(k_B, 13)$ |
| 3 | 4 | 14 | $KSS_4(k_A, 14)$ | $KSS_4(k_B, 14)$ |
| . | . | . | . | . |
| . | . | . | . | . |
| . | . | . | . | . |

TABLE 3(b)

Generation of the Reference Signatures
$KSS_r(k_A, NUM_t)$   t = 1, 2, 3, 4, 5
r = 4   s = 5   TN = 1

$KSS_0(k_A, 0) = DES\{k_A, 0 \oplus k_A\}$
$KSS_1(k_A, 0) = DES\{KSS_0(k_A, 0), 0 \oplus KSS_0(k_A, 0)\}$
$KSS_2(k_A, 0) = DES\{KSS_1(k_A, 0), 0 \oplus KSS_1(k_A, 0)\}$
$KSS_3(k_A, 0) = DES\{KSS_2(k_A, 0), 0 \oplus KSS_2(k_A, 0)\}$
$KSS_4(k_A, 0) = DES\{KSS_3(k_A, 0), 0 \oplus KSS_3(k_A, 0)\}$
$KSS_0(k_A, 1) = DES\{k_A, 1 \oplus k_A\}$
$KSS_1(k_A, 1) = DES\{KSS_0(k_A, 1), 1 \oplus KSS_0(k_A, 1)\}$
$KSS_2(k_A, 1) = DES\{KSS_1(k_A, 1), 1 \oplus KSS_1(k_A, 1)\}$
$KSS_3(k_A, 1) = DES\{KSS_2(k_A, 1), 1 \oplus KSS_2(k_A, 1)\}$
$KSS_4(k_A, 1) = DES\{KSS_3(k_A, 1), 1 \oplus KSS_3(k_A, 1)\}$
$KSS_0(k_A, 2) = DES\{k_A, 2 \oplus k_A\}$
$KSS_1(k_A, 2) = DES\{KSS_0(k_A, 2), 2 \oplus KSS_0(k_A, 2)\}$
$KSS_2(k_A, 2) = DES\{KSS_1(k_A, 2), 2 \oplus KSS_1(k_A, 2)\}$
$KSS_3(k_A, 2) = DES\{KSS_2(k_A, 2), 2 \oplus KSS_2(k_A, 2)\}$
$KSS_4(k_A, 2) = DES\{KSS_3(k_A, 2), 2 \oplus KSS_3(k_A, 2)\}$
$KSS_0(k_A, 3) = DES\{k_A, 3 \oplus k_A\}$
$KSS_1(k_A, 3) = DES\{KSS_0(k_A, 3), 3 \oplus KSS_0(k_A, 3)\}$
$KSS_2(k_A, 3) = DES\{KSS_1(k_A, 3), 3 \oplus KSS_1(k_A, 3)\}$
$KSS_3(k_A, 3) = DES\{KSS_2(k_A, 3), 3 \oplus KSS_2(k_A, 3)\}$
$KSS_4(k_A, 3) = DES\{KSS_3(k_A, 3), 3 \oplus KSS_3(k_A, 3)\}$

TABLE 3(b)-continued

Generation of the Reference Signatures
$KSS_r(k_A, NUM_t)$  $t = 1, 2, 3, 4, 5$
$r = 4$  $s = 5$  $TN = 1$ $KSS_0(k_A,4) = DES\{k_A,4 \oplus k_A\}$
$KSS_1(k_A,4) = DES\{KSS_0(k_A,4),4 \oplus KSS_0(k_A,4)\}$
$KSS_2(k_A,4) = DES\{KSS_1(k_A,4),4 \oplus KSS_1(k_A,4)\}$
$KSS_3(k_A,4) = DES\{KSS_2(k_A,4),4 \oplus KSS_2(k_A,4)\}$
$KSS_4(k_A,4) = DES\{KSS_3(k_A,4),4 \oplus KSS_3(k_A,4)\}$

TABLE 3(c)

Sample ranking vector
$(\rho_0, \rho_1, \rho_2, \rho_3, \rho_4)$
Computed as a function of DATA

| t | $\rho_t$ |
|---|---|
| 0 | 0 |
| 1 | 3 |
| 2 | 2 |
| 3 | 3 |
| 4 | 1 |

TABLE 3(d)

Computation of the Signatures
$SIG_0, SIG_1, SIG_2, SIG_3, SIG_4$
from the sample rankings in Table 3(c)
$r = 4$  $s = 5$  $TN = 1$

| t | $\rho_t$ | | $SIG_t$ |
|---|---|---|---|
| 1 | 0 | $SIG_0=$ | $KSS_0(k_A,0) = DES\{k_A,0 \oplus k_A\}$ |
| 2 | 3 | | $KSS_0(k_A,1) = DES\{k_A,1 \oplus k_A\}$ |
|   |   | | $KSS_1(k_A,1) = DES\{KSS_0(k_A,1),1 \oplus KSS_0(k_A,1)\}$ |
|   |   | | $KSS_2(k_A,1) = DES\{KSS_1(k_A,1),1 \oplus KSS_1(k_A,1)\}$ |
|   |   | $SIG_1=$ | $KSS_3(k_A,1) = DES\{KSS_2(k_A,1),1 \oplus KSS_2(k_A,1)\}$ |
| 3 | 2 | | $KSS_0(k_A,2) = DES\{k_A,2 \oplus k_A\}$ |
|   |   | | $KSS_1(k_A,2) = DES\{KSS_0(k_A,2),2 \oplus KSS_0(k_A,2)\}$ |
|   |   | $SIG_2=$ | $KSS_2(k_A,2) = DES\{KSS_1(k_A,2),2 \oplus KSS_1(k_A,2)\}$ |
| 4 | 3 | | $KSS_0(k_A,3) = DES\{k_A,3 \oplus k_A\}$ |
|   |   | | $KSS_1(k_A,3) = DES\{KSS_0(k_A,3),3 \oplus KSS_0(k_A,3)\}$ |
|   |   | | $KSS_2(k_A,3) = DES\{KSS_1(k_A,3),3 \oplus KSS_1(k_A,3)\}$ |
|   |   | $SIG_3=$ | $KSS_3(k_A,3) = DES\{KSS_4(k_A,3),3 \oplus KSS_4(k_A,3)\}$ |
| 5 | 1 | | $KSS_0(k_A,4) = DES\{k_A,4 \oplus k_A\}$ |
|   |   | $SIG_5=$ | $KSS_1(k_A,4) = DES\{KSS_0(k_A,4),4 \oplus KSS_0(k_A,4)\}$ |

TABLE 3(e)

USER B's Computation of the Successors of
$SIG_0, SIG_1, SIG_2, SIG_3, SIG_4$
from the sample rankings in Table 3(c)
$r = 4$  $s = 5$  $TN = 1$

| t | $\rho_t$ | Presumptive Value of $SIG_t$ | Number of Successors to be computed |
|---|---|---|---|
| 0 | 0 | $KSS_0(k_A,0)$ | 4 |
| 1 | 3 | $KSS_3(k_A,1)$ | 1 |
| 2 | 2 | $KSS_2(k_A,2)$ | 2 |
| 3 | 3 | $KSS_3(k_A,3)$ | 1 |
| 4 | 1 | $KSS_1(k_A,4)$ | 3 |

TABLE 3(f)

Signatures appended to DATA
Based on the rank from Table 3(c)
$TN = 1$

| t | $NUM_t$ | $\rho_t$ | $t^{th}$ Signature - $SIG_t$ |
|---|---|---|---|
| 0 | 0 | 0 | $KSS_0(k_A,0)$ |
| 1 | 1 | 3 | $KSS_3(k_A,1)$ |
| 2 | 2 | 2 | $KSS_2(k_A,2)$ |
| 3 | 3 | 3 | $KSS_3(k_A,3)$ |
| 4 | 4 | 1 | $KSS_1(k_A,4)$ |

Referring further to the example the value $\rho_t$ refers to the rank of a particular signature element wherein $0 \leq \rho_t \leq (r-1)$. The subscript t refers to the particular signature digit in the total set of signatures which is being evaluated wherein $0 \leq t \leq (s-1)$. In addition to designating which of the elements of the ranking vector is being evaluated, t inferentially specifies which number $NUM_t$ was involved in computing a particular keyed signature sequence. Thus, in table 3 (d) the formula KSS $\rho_t$ refers to the $\rho_t^{th}$ element of the $t^{th}$ keyed signature sequence.

Referring now specifically to table 3 (a) the contract exchanged between two USERS A and B is illustrated. As will be apparent, it is not necessary for USER B to have the data in the column "USER B" and similarly USER A need not have the data in column "User A" in his stored table they are each able to compute this information on location.

As the column marked TN (transaction number) indicates, the table is broken into a series of sections each section of which may be used for only one transaction. Means must, of necessity, be provided in the system for indicating which transaction is being performed in order that the USERS may go to the proper section of their contract tables. In the present example, since there are to be five signatures which will accompany each message, five separate signature sequences must be utilized and accordingly the numbers zero (0) through four (4) are utilized to generate the first set of reference signatures $KSS_r$. Similarly, if it is known that the third transaction is being performed, the numbers 10 through 14 would be utilized as will be understood. The column t indicates the specified relationship between a particular signature element and the specific number $NUM_t$ to be used in generating both the signature element and the reference signature. The number $(NUM_t)$ need not be transmitted as part of the message as it is clearly inferred that the fourth keyed signature sequence digit appended to the original message will, by definition, result in a computation t=3 which will give a value of 4 to the quantity $NUM_t$ in the first transaction. Upon completion of the iterative generation of the successor signatures and finally the reference signature for each sequence, the entry in the reference signature contract table opposite t=3 will be utilized for comparison purposes. It will further be noted that the values of t repeat themselves with each transaction for obvious reasons.

The actual reference signature entries are generated independently and secretly by USER A and USER B utilizing their own secret keys $K_A$ and $K_B$ and the previously agreed upon values of $NUM_t$ to produce the contract.

Referring now to table 3(b) a tabular representation is shown for the generation of all five reference signatures $KSS_r$. In this particular table it is assumed that the first transaction is being considered. The evaluation of the various elements of the table clearly shows the key chaining of one operation to the next.

Table 3(c) illustrates or gives a value to a hypothetical ranking family $\rho_0 \ldots \rho_{s-1}$. It is assumed that the last ten bits of the output of the ranking vector generation produce five two-bit groups having the values shown in column $\rho_t$. These are arbitrarily set to 0, 3, 2, 3, and 1 for purposes of the present example. It will however be noted that a particular generation of the ranking family for a particular data stream will always produce exactly the same ranking vector regardless of whether USER A or USER B performs the computation.

Table 3(d) illustrates graphically the generation of all five signatures where TN=1 and for the particular ranking family shown in table 3(c). The particular signatures which would accompany the message of the present example would be those clearly shown in table 3(d) as $SIG_0 \ldots SIG_4$.

Table 3(e) illustrates graphically the generation of the reference signatures from the five received signatures accompanying the message, from USER A to USER B. It is assumed that USER B has already computed the ranking family for the message and has derived the value shown in table 3(c). Referring to the table the system must generate the successors to the signature sequence element $KSS_3$ and finally the reference signature $KSS_r$. The way in which this is done is clearly shown in table 3(e).

Referring finally to table 3(f) the complete evaluation of the contents of the message to produce the ranking family and the signatures generated therefrom and transmitted from USER A to USER B is clearly shown. It should be understood that these signatures concatenated to DATA is the sole data transmitted between the users. The five signature digits are clearly indicated as to their mathematical content with relation to the contract table. This is assumed in the evaluation of the variables t, $\rho_t$, and $NUM_t$. The particular ranking family utilized is shown in table 3(c) and similarly it is assumed that the first transaction is taking place so that the value of NUM varies between 1 and 5. It will finally be noted that USER B upon receiving such a message from USER A is able to derive the three variables for each of the signatures and utilizing this data together with his knowledge of the particular KSS generation algorithm is able to produce the final reference signatures $KSS_r$ and to compare the values obtained from each signature digit with the entry in the table. As will be appreciated, if they are all precisely equal the message will be accepted by USER B as a properly signed transaction.

While, as stated previously, the herein described simplified example utilizes smaller values for r and s than would be normally utilized in such a system. It should be clearly understood that the actual operations would be identical for a value of $r=16$ and a value of $s=20$ as utilized in the herein disclosed preferred embodiment. Thus, in the present embodiment 20 separate signature digits would be appended to each data message and the ranking family would obviously consist of 20 separate elements. Similarly a particular element of the ranking family $\rho_t$ could assume a value $\rho=0$ through 15 and accordingly as many as 15 elements of a particular keyed signature sequence might have to be generated (where $\rho=0$) to produce the final reference signature $KSS_r$.

Best Mode for Carrying Out the Invention

As stated previously, it will be apparent to those skilled in the art that the present transaction and identity verification system utilizing the unique one-way keyed signature sequences could be carried out using a suitably programmed general purpose computer or conversely could be more expeditiously performed on a small special purpose computer built into the user terminals which are, in turn, interconnected via the common data link or communication network. Additionally, the method could be performed on a combination of the above two.

The disclosed hardware system comprises the preferred embodiment of the invention and, accordingly, this embodiment will now be specifically described with reference to the hardware drawings of FIGS. 1 through 5 and the system function and data flowcharts shown in FIGS. 6 and 7.

Referring to FIG. 1, there is shown, the overall organization of a typical subscriber data network which illustrates a plurality of USERS A through N being connected to the public data network via individual transaction terminals. As will be appreciated, a great many subscribers would typically be connected to such a network although it is, of course, to be understood that only a limited number may be provided with transaction terminals equipped with the transaction verification system, as set forth and disclosed herein. Also, it should be clearly understood that the present invention or protocol must be carried out between selected pairs of users. Thus, USER A and USER B must have established a contractural relationship and exchange the keyed signature sequence contract prior to their conducting any transactions in accordance with the present invention. Obviously, any single user may have separate contracts with a plurality of other users on the system as the need may arise. Thus, USER A would have separate keyed signature sequence contracts with USER B, USER C, USER D etc., if it were anticipated that business transactions would be carried out between all of these parties requiring a degree of security afforded by the present system.

For the purposes of the following description a single pair of users, USER A and USER B will be considered, however, it will be obvious to those skilled in the art that exactly the same mechanism would be utilized by all of the transaction terminals if so desired.

Referring now to FIG. 2, a high-level, functional block diagram of a typical transaction terminal is illustrated which would be supplied to any user requiring same. It should be noted that this terminal is quite conventional in nature, with the exception of the Signature Processing Unit 10 connected to the terminal microprocessor unit 12. The Signature Processing Unit 10 contains all of the functional controls necessary for carrying out the operations required of the present invention. It is this block which will be specifically set forth and described in detail subsequently. Before proceeding with the description of this unit however, it should be noted that the display 14, the display control 16 and the keyboard 18 are all intended to be conventional I/O units resident in such a terminal based system and the display could either be a TV raster type display or a much more sophisticated display unit equipped with light pens, etc. These features however, have no bearing on the present invention and other than noting their function, will not be described further. Similarly, the communication control unit 20 and system memory unit 22 are intended to be completely conventional. They are well known in the art and are intended to operate in a purely straightforward manner. Thus, the only functions required of the overall transaction terminal, exclusive of the unit 10, are that the terminal operator must recognize that a "signed" message (or "error" message) has been received and must notify the signature processing unit 10 that the various transaction protocol operations must be carried out. Similarly, the terminal microprocessor must control the storage of the received message and appended signature data in the system memory unit 22 from which the received messages (including signatures) may be transferred to the signature processing unit when necessary.

Otherwise, the operation of such terminals, under control of their resident microprocessor is extremely well known in the art and will not be gone into in greater detail since the performance of the various operations required of the terminals are straightforward. An almost identical terminal architecture is also shown in the previously referenced co-pending application of the present inventor, Ser. No. 053,589 "Method and Apparatus for Transaction Identity Verification" filed June 29, 1979 (now allowed).

Referring to FIG. 3, there is shown an overall functional block diagram of the signature processing unit which performs the present transaction and identity verification function. To end this block, the key function unit is the Rank/Signature/Successor Generator (RSSG) which, as will be apparent, from the subsequent description, forms the necessary data processing to provide the ranking family s, vector having s elements, generates the individual signatures $KSS_{pt}$ and generates the successor signature elements to provide the ultimate reference signature $KSS_{rt}$. The details of this unit are shown in FIG. 5 and specific control functions for the RSSG are set forth in Table 5.

The other block of FIG. 3, the control unit 32, is set forth in detail in FIG. 4 as will be described subsequently.

Referring specifically to FIG. 3, it will be noted that the signature processing unit is composed of four major functional blocks identified as the control unit 30, message store 32, the RSSG 36 and comparator 38.

Control unit 30 as disclosed herein is a relatively conventional and straightforward microprocessor which is shown in greater detail in FIG. 4. The message store 32 is a straightforward memory having an associated address generator in which the given message whether an originally received message (DATA) from a sender or an acknowledgement message (ACK) from a receiver, together with its associated signatures is stored. In the overall operation of the terminal the received message would conventionally be stored in the terminal system memory unit 22 and as the message is displayed upon the screen, the operator would appropriately initiate the transaction verification sequence which would cause the message to be transferred into the message store 32.

The RSSG block 36 is shown in greater detail in FIG. 5 and includes the DES box and the appropriate registers and controls for generating the various keyed signature sequences required of the system, whether they be the original reference signatures, the signature elements which are to accompany either the original message or the acknowledgement message or the successor signature sequences from which the receiver of a particular message must generate the reference signatures for comparison with the contract. Further, this unit contains the necessary controls for also generating the ranking vector s utilizing the message as both the data and key input in the particular ranking family generating method utilized in the disclosed embodiment. Here again, it must be remembered that a number of algorithms have been disclosed for generating the ranking vector any of which would produce satisfactory results. It is, of course, necessary for both users on the system to be utilizing the same method or the system would obviously not work.

The comparator unit 38 performs the obvious function of comparing the sequence of generated reference signatures with the reference signatures contained in the original contract exchanged between the two users and which would normally be stored in the system memory unit 22 of the transaction terminal. Thus, as will be understood the control unit in FIG. 4 would be provided with the necessary controls for gating the received message from the message store 32 into the RRSG unit 36 as required to perform the ranking vector generation and also the various keyed signature sequence generation operations as required. The operation of the various components of the signature processing unit are straightforward and would be obvious to those skilled in the art. A subsequent description of the flowcharts of FIGS. 6 and 7 taken together with the Operational Sequence charts which identify, with more particularity, the specific operations required of each step of the flowchart will greatly facilitate an understanding of the present system.

Referring now to FIG. 4, the hardware details of the control unit 32 of FIG. 3, are set forth. This is essentially a conventional microprocessor controlled unit, similar in function to the microprocessor 12 in the transaction terminal of FIG. 2.

FIG. 4 is a detailed functional block diagram of the components of the control unit 30 of FIG. 3. This unit is a completely straightforward microprocessor having at its' heart, a well known controller ROM (read only memory) containing sequences of instructions which produce the requisite system signals for controlling the overall signature processing unit. As will be well understood, upon an indication of the operation to be performed by the terminal controller microprocessor, various sequences of commands will be accessed from the memory (ROM) and placed in the control word register 44 from whence various control lines will be activated to provide control signals, for example, on lines C-0 through C-12 (as indicated in FIG. 5 and Table 5). It will be appreciated that together with the other control lines specifically shown and labelled in FIGS. 4 and 5 that the primary functional operations required of the present system may be performed. As individual control words are interpreted and executed and "status" signals return from the controlled units, either the next instruction will be accessed or specified by a signal on the "sequencer instruction" line or the system will branch to some other control sequence as indicated by a signal on the "branch address" line. These operations are performed in the control memory address sequencer 46, shown in the figure. As will be apparent, before the next instruction will be considered, certain of the status signals as specified by a given instruction must be received via the status condition multiplexor 48. The particular status condition to be looked at and specified by the "test condition select" line controls the status condition multiplexer 48. Counter 50 is loaded from the ROM and is indexed via the "counter-control line" from the control word register 44.

This particular hardware configuration is merely a convenient way of controlling a number of operations within the present system dependent on a predetermined number of iterative operations occurring depending on system parameters such as $p$ and $t$.

The operation of the command register 52 and the Memory Address mapping ROM 54 perform the obvious function of initiating operations in the SPU control unit when requested by the terminal controller. Details of the specific operations required and their sequence of occurrence will be clearly apparent from the following description of the system flowcharts of FIGS. 6 and 7 and from a close inspection of the Operation Sequence Lists following.

It is further to be noted, that the present control unit is also very similar to the control unit set forth and described in the previously referenced co-pending application, Ser. No. 053,589.

Before proceeding with the detailed description of FIG. 5, which is a combination functional block and logical schematic diagram of the RSSG unit, the following general comments about the operation of the system will aid in an understanding of the functional characteristics of the individual units of FIG. 5.

As will be readily apparent from the preceding description of the mathematical basis of the invention and the general description of the present transaction and identity verification protocol, each terminal belonging to a particular user must have the following functional capabilities. It must be able to generate the original reference signature list which is to become a portion of the keyed signature sequence contract to be exchanged between the various users of the system. Having once generated a contract with a pre-determined and agreed upon set of numbers (NUM's), each terminal must be able to perform the following operations. Assuming that a particular message (DATA) is to be sent, the user must first generate a ranking vector of s elements. Next, using the ranking vector, the user must generate a series of actual signature digits or elements ($KSS_{pi}$) to be appended to the message and sent to the receiver (USER B). It is, of course, to be understood that the signatures must be a predetermined function of the sender's (USER A's) secret encryption key ($K_A$), and the particular number (NUM) previously agreed upon and specified for each of said signatures. It is, of course, assumed that the users have agreed upon the system parameters r and s which specify the number of elements (r) of an individual keyed signature sequence and the actual number of signatures (s) which are to be appended to each message.

Finally, each transaction terminal, upon receipt of an appropriately signed message, must be capable of independently generating the ranking vector s and subsequently generate the successor members or elements of the keyed signature sequence applicable to each received signature digit to finally generate the referenced signature $KSS_r$, associated with or derivable from the received signature. Each terminal must have a means for comparing the derived reference signatures with the reference signatures contained in the previously exchanged contract for identity.

Having completed this initial message exchange or protocol the receiving terminal must then, in effect, construct a new data message, i.e., "I have received and verified your message DATA". In the present description this new or acknowledgment message is referred to by the term ACK. This new message is then processed and signed by the original recipient USER B and returned to USER A who must then repeat the signature verification process and if the original message DATA is correct and also the signatures, and place same in appropriate archival files and the transaction may be considered to be completed.

As described previously, in the present embodiment the ranking vector is defined as the last eighty bits (20 hex digits) of the "compressed encoding" of the message (DATA). This is accomplished by feeding the data concurrently into both the data input port and the key input port of the DES unit, always saving the last eighty bits of the output until the entire data message has been processed to produce the ranking vector. The cryptographic function performed by this operation is represented generally by the formula:

$$DES\ CMP\ (DATA, DATA)$$

where the DATA is composed of a plurality of segments ($X_o \ldots X_n$) and the output of the DES operations produces an equal number of segments ($Y_o \ldots Y_n$) the compressed encoding (DESCOMP) requires key chaining whereby any given output segment $Y_i$ is represented by the formula:

$$Y_i = DES(Y_{i-1}, X_1)$$

The generation of the keyed signature sequences is somewhat more complex as described previously, since the essence of the one-way keyed signature sequence generation is the chaining or utilization of the output of one sequence generation operation in the next succeeding sequence generating operation as represented by the formula:

$$KSS_i = DES(KSS_{i-1}, NUM \oplus KSS_{i-1})$$

In the present embodiment this operation is rendered somewhat more complex (and thus more secure) than that set forth above by additionally combining the output from the previous operation into the data port in addition to using it as the sole key input at the key port of the DES unit. An individual signature generation operation may be represented by the formula:

$$KSS_i = DES(KSS_{i-1}, KSS_{i-1} \oplus NUM).$$

Referring now to FIG. 5, the data flow for performing the three above referenced operations which require the use of the DES unit 60 will be described. It should first be clearly understood that the particular encryption system utilized in the present embodiment is that known as the "Data Encryption Standard" which was referenced in detail previously in the specification. As stated previously in the section of the specification entitled "Mathematical Basis for the Invention" other encryption systems could conceivably be utilized with the present invention which might not follow the precise requirements of the standard. However, these, of necessity, would utilize an encryption unit requiring both a data input port and a key input port and would possess an encryption algorithm sufficiently strong that it is mathematically impractical for anyone to be able to decode the message to derive the key or to exhaustively try keys until a proper one is found.

Proceeding now with the description of FIG. 5, registers 62 and 64 are used to store the data input for the DES unit until such time as an appropriate signal appears on control line C10 to gate the desired data through the data input multiplexer 66 into the data port of the DES unit. In the operation of the RSSG unit, data register 62 stores the data to be input to the system during the generation of the ranking vector whereas register 64 functions to store the number NUM utilized in the generation of the keyed signature sequences. Registers 68 and 70 are both utilized to store key data for gating through key input multiplexer 72 in the key port of the DES unit.

Register 68 stores the initial keys ($x_o$ and $K_x$) for generating both the ranking vector and the keyed signature sequences (i.e., $Y_o$ and $KSS_o$).

Register 70 is utilized in generating both the ranking vector and the keyed signature sequences after the initial operation wherein the output from the DES unit 60 is used as the key input ($Y_{i-1}$ and $KSS_{i-1}$) for subsequent operations. Control line C11 determines which of the two keys are to be used during a given operation. It will also be noticed in the figure that cable 74 provides a data path for transmitting the key as a second input to the exclusive or network 76 so that the key is appropriately exclusive ored with NUM from register 64 to provide this modified input to the data port of the DES unit for the next encryption operation.

Table 5 following, illustrates the particular functions performed by each of the control lines labeled C0 through C11. The functions performed by each are obvious as described and will not be discussed further with the exception of the control line C7 which is utilized to increment register 64 which contains the value NUM. The incrementing pulse may be utilized when the system is designed so that it is known that the numbers involved in producing the keyed signature sequences are consecutive. If these numbers were not so ordered, they would simply be gated directly to the register in an obvious fashion.

The Table 5 also indicates the content of the status line S0 from the DES unit which serves to notify the system when a particular encryption operation has been completed so that the next element of a given sequence may be generated or the generation of the next keyed signature sequence initiated as appropriate.

TABLE 5
CONTROL/STATUS SIGNAL ASSIGNMENT, RSSG. (FIG. 5)

| CONTROL SIGNAL | OPERATION CONTROLLED |
|---|---|
| C0 | Load key input to DES unit |
| C1 | Load data input to DES unit |
| C2 | DES unit mode control (encipher/decipher) |
| C3 | Convert data in DES unit |
| C4 | Enable DES unit output |
| C5 | Load Reg 62 from data bus |
| C6 | Load Reg 64 from data bus |
| C7 | Increment 64 |
| C8 | Load Reg 68 from data bus |
| C9 | Load Reg 70 from data bus |
| C10 | Select source for data input to DES unit |
| C11 | Select source from key input to DES unit |

| STATUS SIGNAL | STATUS INDICATION |
|---|---|
| S0 | DES unit status (busy/done) |

Figure 7:
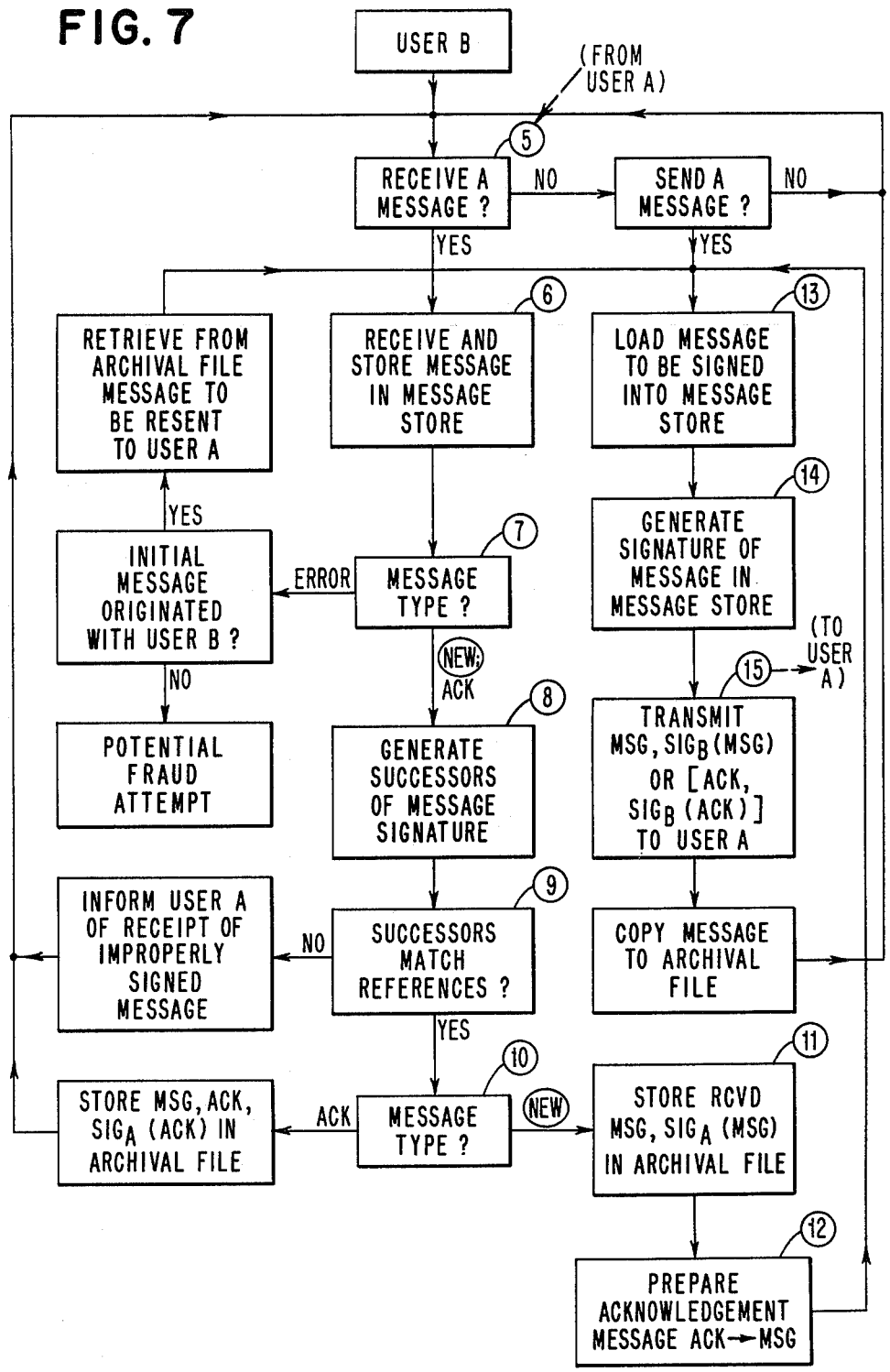

Having completed the functional description of the hardware embodiment of the present system as set forth in FIGS. 1 through 5, there will now follow a functional description of the operation of the system taken in conjunction with the flowcharts of FIGS. 6 and 7. It will be noted that the two flowcharts are identical insofar as their content is concerned. However, the different boxes, or elements, of the flowcharts are numbered differently in accordance with the operations performed by a particular terminal depending on whether it is functioning as a sender or receiver. Assume that User A is initiating a transaction and is thus the sender and User B is the recipient of the transaction which requires that he first receive the message, verify the signature, generate an acknowledgment message, appropriately append his signatures thereto and retransmit to User A. Then User A must verify the acknowledgment message.

The sequentially numbered blocks indicate the operations performed sequentially from steps 1 through 22. It will further be noted that these numbers are circled and are different from the other reference numerals which, in essence, key the flowchart to the subsequent operational sequence lists. Each group of instructions in the operational sequence lists are prefaced by the number of a particular box of the flowchart to which they refer.

Thus, to fully understand each functional operation required in the boxes of the numbered flowcharts reference may be made directly to the operational sequence lists.

The operational statements in the operational sequence lists are obviously a higher level descriptive recitation of the function than the specific microcode format which would be utilized. It would however, be within the knowledge of a person skilled in the art to produce the actual microcode from the functional statements in the operational sequence list for the particular hardware configuration utilized.

Referring now to the flowchart sequence of FIGS. 6 and 7, several general observations should first be made. Referring to FIG. 7, the decision blocks numbered 5, 7, 9 and 10 (FIG. 7) and 1 and 24 (FIG. 6) represent decisions made by the operator at the operators console. For example, the particular form or type of the message would be obvious to the operator when it is received and printed on his display screen. He would assumedly known whether it was an original message, an acknowledgement message, or an error message and would initiate an appropriate response operation via some sort of data entry system such as the keyboard provided.

Referring briefly to FIG. 6 blocks 24, 25 and 26 are entered via an "error" indication in block 18. Block 25 refers to the detection of a fraud wherein no particular action is required in the system. This would be up to the particular procedures of the users and forms no part of the present invention. Block 26 represents the detection of a legitimate transmission or some other computational error in the system which would result in the operator retrieving the original message from the archival store and retransmitting same whether a "new" message or an "acknowledgement" message.

As will be apparent from the previous description of the present preferred embodiment, it is assumed that the value of r is 16 and the size s of the ranking vector is 20. However, the particular hardware disclosed is not limited to such numbers. For example, the numbers 4 and 5 respectively were used for these two parameters in the previously described simplified example and could be appropriately loaded into the system controls. The format of the data for values of $r=16$ and $s=20$ is shown clearly in Tables 4(a) and 4(b), which are illustrative of a contract exchanged between Users A and B and the specific steps of generating a keyed signature sequence for a value of $r=16$. These two tables are similar to Tables 3(a) and 3(b) described previously, with reference to the simplified example. The only difference is being that they are obviously longer in order to accommodate instead of 5 individuals reference signatures for each transaction in the contract. Further, each referenced signature generation sequence must comprise $r+1$ generation steps beginning with the original step for generating $KSS_0$ which involves use of the various users' secret keys $K_x$. Inferentially, of course, the generation of the actual signature element $KSS_\rho$ and the generation of the successors to produce the reference signature $KSS_r$ must also accommodate the larger r value.

TABLE 4(a)

| | System Variables | | Contract Reference Signatures | |
|---|---|---|---|---|
| Transaction Number | t | NUM | User A | User B |
| 1 | 0 | 1 | $KSS_t(K_A,1)$ | $KSS_t(K_B,1)$ |
|   | 1 | 2 | $KSS_t(K_A,2)$ | $KSS_t(K_B,2)$ |
|   | 2 | 3 | $KSS_t(K_A,3)$ | $KSS_t(K_B,3)$ |
|   | . | . | . | . |
|   | . | . | . | . |
|   | . | . | . | . |
|   | 19 | 20 | $KSS_t(K_A,20)$ | $KSS_t(K_B,20)$ |
| 2 | 0 | 21 | $KSS_t(K_A,21)$ | $KSS_t(K_B,21)$ |
|   | 1 | 22 | $KSS_t(K_A,22)$ | $KSS_t(K_B,22)$ |
|   | 2 | . | . | . |
|   | . | . | . | . |
|   | . | . | . | . |
|   | . | . | . | . |
|   | 19 | 40 | $KSS_t(K_A,40)$ | $KSS_t(K_B,40)$ |
| 3 | 0 | 41 | $KSS_t(K_A,41)$ | $KSS_t(K_B,41)$ |
|   | . | . | . | . |
|   | . | . | . | . |
|   | . | . | . | . |
|   | 19 | 60 | $KSS_t(K_A,60)$ | $KSS_t(K_B,60)$ |
| 4 | 0 | 61 | $KSS_t(K_A,61)$ | $KSS_t(K_B,61)$ |
|   | . | . | . | . |
|   | . | . | . | . |
|   | . | . | . | . |
|   | 19 | 80 | $KSS_t(K_A,80)$ | $KSS_t(K_B,80)$ |
| 5 | 0 | 81 | $KSS_t(K_A,81)$ | $KSS_t(K_B,81)$ |

TABLE 4(b)

$t^{th}$ signature sequence where $0 \leq t \leq s - 1$

Signature Generation by User A:
- $KSS_0 = DES(K_A, NUM)$
- $KSS_1 = DES(KSS_0, NUM)$
- $KSS_2 = DES(KSS_1, NUM)$
- $KSS_3 = DES(KSS_2, NUM)$
- $KSS_4 = DES(KSS_3, NUM)$
- $KSS_5 = DES(KSS_4, NUM)$
- $KSS_6 = DES(KSS_5, NUM)$
- $KSS_7 = DES(KSS_6, NUM)$
- $KSS_8 = DES(KSS_7, NUM)$
- $KSS_9 = DES(KSS_8, NUM)$ $p^{th}$ element → $KSS_{10} = DES(KSS_9, NUM)$    ← $KSS_{p_t} = DES(KSS_{p_t-i} NUM)$ Successor Generation to device reference signature by User B:
- $KSS_{11} = DES(KSS_{10}, NUM)$  -value of p from ranking family
- $KSS_{12} = DES(KSS_{11}, NUM)$  -value of t determined from signature sequence
- $KSS_{13} = DES(KSS_{12}, NUM)$
- $KSS_{14} = DES(KSS_{13}, NUM)$
- $KSS_{15} = DES(KSS_{14}, NUM)$  -value of transaction number from internal bookkeeping
- 15  $KSS_r = DES(KSS_{15}, NUM)$  -value of NUM from value of t & transaction number

--- for generating the signature sequences must be a one way sequence wherein it is virtually impossible mathematically for a user attached to the system or any other possible penetrator, to be able to derive a predecessor of the transmitted signature $KSS_i$ and inferentially, not be able to derive any of the users' secret keys $K_x$.

Proceeding now with a description of the operation of the present preferred embodiment of the invention, reference should first be made to FIG. 6. Here, it is assumed that the operator representing User A wishes to send a message (see block 1) which causes the system to proceed to block 2. At this point, the operator must cause the particular message to be signed to be gated into the message store 32 on FIG. 3. This done, the system proceeds to block 3 wherein the system controls automatically cause the message in the message store to be converted into a "signed" message with appropriate signature digits.

As will be apparent, the system must first automatically generate the ranking vector s by appropriately encoding the message DATA as described previously, by compressed encoding and extract the last 10 bytes of this encoded message. It must then separately extract the 20 individual base 16 digits of the overall ranking vector s. Having done this, the system controls will cause the requisite 20 signatures to be generated, utilizing the 20 elements of the ranking vector which specify the particular element of each keyed signature sequence which is to be transmitted as the signature. Having generated the 20 signature elements the system proceeds to block 4 which causes the message DATA to be concatenated with the 20 signatures and transmitted to User B.

At this point, control in effect, transfers to FIG. 7 in User B's terminal. Block 5 indicates that the operator at User B's terminal received the transmitted message from User A and recognizes this as a received message and causes the system to proceed to block 6.

As one final point, it should again be reiterated that the specific encryption block used herein and designated as the DES block could take on other forms than that of the Digital Encryption System designated as the Federal Information Processing Standard referenced previously.

It should also be remembered that the particular method of generating the ranking family and the particular algorithm utilized in generating the individual keyed signature sequences could also take on a number of different forms as set forth and described in the section of the specification entitled "Mathematical Basis for the Invention". The key element is that the sequence In block 6, the system causes the just received message with attached signatures to be placed in the message store 32 in User B's terminal.

In block 7, the operator indicates whether the received message is an error, a new message, or an acknowledgment message and appropriately initiates control for indicating to the system which sequence is next to follow.

Upon the entry of block 8 the system generates the successors of the received message signatures. It will be remembered that in order to do this he must first generate the ranking vector s from the DATA portion of the received message. Having generated the ranking vector the system enters the control sequences for generating the reference signatures, utilizing the generated ranking vector s and the 20 received signatures which accompanied the original message. At this point the original contract data is appropriately accessed from the system memory unit 22 (on FIG. 2) to obtain the required values of NUM for generating each reference signature and also for obtaining the stored value of the reference signature pertaining to that value NUM.

Utilizing the specific value of NUM for a particular signature, the actual value $p_t$ of the associated element of the ranking vector and the transmitted signature digit $KSS_{p_t}$ the system proceeds to generate the successors for each signature and upon the generation of the associated reference signature $KSS_{r_t}$ an identity comparison is made in the comparator 38 on FIG. 3, and if all signatures match an appropriate "valid" indication is given to the operator as shown in block 9 in FIG. 7. The system then proceeds to block 10 on the flowchart of FIG. 7 wherein the operator indicates to the system whether the just received message was a new message or an acknowledgement message. Since it was a new message the system proceeds to block 11 where it causes the received message together with its attached signatures defined in the flowchart as:

MSG, SIG$_A$ (MSG)

to be stored in the archival file for future reference. The archival file would normally be in the system memory unit 22 on FIG. 1.

The flowchart then proceeds to block 12 where an acknowledgement message is prepared. This message is simply the original message MSG with an appropriate header for example, "User B acknowledges receipt of a verified message (MSG) on (DATE) at (TIME)". This acknowledgement message becomes the new message to be signed in block 13 thus:

ACK MSG

The system then proceeds to block 14 where exactly the same operation is performed as was described previously with respect to block 3 of FIG. 6. The exception is that the message is different this time due to the additional wording applied in the acknowledgement as described above. However, all of the actual system operations are the same in that a new ranking vector s must be generated and appropriate signatures must be generated in accordance with the evaluation of the ranking vector.

The system then proceeds to block 15 which causes the newly signed message element represented as:

ACK, SIG$_B$ (ACK)

to be transmitted back to User A and referring back to FIG. 6, this message is received and placed on the display console and reviewed by the operator at User A's terminal. The message will be displayed on the screen which will cause the operator at User A's terminal to proceed to block 17 which causes the received message to be stored in the memory store 32 FIG. 3. The operator will again view the message in block 18 and by actuating the proper control will cause the system to proceed to block 19 since the received message has the format of an acknowledgement (ACK) message. In block 19, the acknowledgement message, will be analyzed and the successors and finally the reference signatures generated exactly as described in block 8 of FIG. 7. A different ranking vector will be generated for the acknowledgement message. The same values of NUM utilized for the original (new) message may or may not be utilized depending upon the particular protocol previously adopted by the users.

Upon the completion of the generation of the reference signatures the system proceeds to block 20 wherein a determination is made to see if all of the reference signatures generated match those in the appropriate entries of the contract. If so, the system proceeds to block 21 wherein the operator causes the system to branch to block 22 since this is an acknowledgement message.

In block 22 an essentially bookkeeping type of operation is performed wherein all of the essential data accompanying the transaction:

MSG, ACK, SIG$_B$ (ACK)

are caused to be stored in User A's archival file in system memory unit 22 in case there should be a later dispute about the particular transaction.

It should be noted in passing that had an unsuccessful match occurred as a result of the test made in blocks 9 and 20 of the respective terminals, block 23 as indicated on FIG. 6 would have been entered which would cause the other user to be informed of the receipt of an improperly signed message. This would cause the sequence of blocks 16, 17, 18, 24 and 26 (as shown in FIG. 6) to be performed which would have caused a particular erroneously received message to be retrieved from the archival file and be sent to the particular user who had detected some sort of an error in transmission.

From the above description, the operation of the present preferred embodiment of the system, insofar as a transaction and identity verification operation is concerned will be obvious. It is also believed obvious to activate the disclosed hardware to form the original contract in that the RSSG would simply be instructed to generate, for the respective users, reference signatures $KSS_r$ for all the values of NUM which are contained in the contract to be exchanged.

No other specialized hardware is necessary to resolve disputes as outlined in the "Mathematical Basis for the Invention" and essentially, this operation is carried out by an agreed upon arbiter who examines the messages for any respective users' archival file supplied to him, and is able to resolve most disputes on inspection.

However, if the dispute arose as to the legitimacy of a particular signature based upon a particular message it would be necessary for the arbiter using no more than a disclosed terminal to obtain the particular users' secret key $K_X$ and utilizing the particular values of NUM and the message content first generate a ranking vector and then generate the particular signature elements to see if they matched those received during the protocol. If they, in fact, do match the particular user claiming not to have sent the message would be found by the arbiter to be in error and would assumedly lose the dispute.

The other general type of situation which was described in the "Mathematical Basis for the Invention" previously, is that one user states that he sent a different message than the one allegedly received by the other user. If the original sending user can prove that the message he allegedly sent results in signature elements appended to the message all of which had a lower rank, (i.e., earlier in time) than the signatures alledged by the receiver, then he would prevail. This procedure would also require the arbiter to regenerate a complete reference signature list for each signature element beginning with $KSS_0$ to see if the above fact situation were present or not.

This completes the description of the operation of the presently disclosed preferred embodiment of the invention taken in conjunction with the flowcharts of FIGS. 6 and 7. The following Operational Sequence List tied into the flowcharts will indicate precisely what functional steps occur in certain specific boxes. It will be noted that since FIGS. 6 and 7 are essentially the same, only FIG. 6 contains the specific reference numbers tied into the Operational Sequence List. Exactly the same operations or sequences would be utilized in FIG. 7, or for that matter, in any other terminal configured in accordance with the presently disclosed preferred embodiment.

This list comprises a sequence of the individual operations which would conventionally be performed by micro-code stored in the microprogram memory of the Central Unit of the SPU which operations must be performed to practice the herein disclosed preferred embodiment of the invention. Referring to these Operational Sequence Lists which are numbered in accordance with the indicated blocks of the flowchart, the discrete operations carried out and the manner in which the various units of the SPU hardware shown specifically in FIGS. 2 through 5 operate would be readily understood.

It will be further understood by referring to the Operational Sequence List that the detailed operations are enumerated only for blocks 1, 2, and 3 since these are the unique operations required at the SPU. The other blocks represent operations notoriously old in such terminals or are decisions made by the terminal operator. Examples of these are blocks 4 and 5 which are conventional memory access operations as are blocks 6, 7 and 8. Similarly block 9 requires a conventional message transmission operation between terminals.

OPERATION SEQUENCE LIST 1

Step
1. "Generate Signature of Message in Message Store."
1.1 Load counter (50) with 8-byte block count (N) from Address Generator (34)
   Set: C2=C10=C11=0
   Set Address Generator to point to the beginning of MESSAGE area of Message Store (32).
1.2 Read next 8-byte block from MESSAGE area of Message Store (32).
1.3 Load Data register (62) and Key register (68) with 8-byte block from Message Store (32): C5←1, C8←1.
1.4 Load Key input to DES unit: Cφ←1
1.5 Load Data input to DES unit: C1←1
1.6 Convert data in DES unit: C3←1
1.7 Test Status condition Multiplexor (40):
   If status line Sφ=φ, wait
   If status line Sφ=1, continue
1.8 Enable DES unit output: C4←1
1.9 Load output register (70) from DES unit: C9←1
   Load DES output into WORKSPACE area in Message Store (32)
1.10 Test Status Condition Multiplexor (40):
   If counter (50) count≠φ, go to step 1.11
   If counter (50) count=φ, go to step 1.21
1.11 Set: C11=1
1.12 Read next 8-byte block from MESSAGE area of Message Store (32).
1.13 Load Data register (62) with 8-byte block from MESSAGE area of Message Store (32): C5←1.
1.14 Load Key input to DES unit: Cφ←1
1.15 Load Data input to DES unit: C1←1
1.16 Convert data in DES unit: C3←1
1.17 Test Status Condition Multiplexor (40):

---
If status line Sφ = φ, wait
              = 1, continue
---

1.18 Enable DES unit output: C4←1
1.19 Load Output register (70) from DES unit: C9←1
   Load DES output into WORKSPACE area in Message store.
1.20 Test Status Condition Multiplexor (40):

---
If counter (50) count ≠ φ, go to step 1.12
                       = φ, continue
---

1.21 Transfer last 10 bytes of information placed in the WORKSPACE area of Message Store (32) to the memory space allocated for storing RANK.
1.22 Set ADDRESS GENERATOR to point to first 4-bit digit in RANK area of Message Store.
1.23 Load value of NUM into Register (64) from Microprocessor Terminal Controller (12).
1.24 Load User Key into Register (68).
1.25 Set: C1φ=1
1.26 Load counter (50) with RANK digit from RANK area of Message Store
   Set: C11=φ
1.27 Load Key input to DES unit: Cφ←1
1.28 Load Data input to DES unit: C1←1
1.29 Convert data in DES unit: C3←1
1.30 Test Status Condition Multiplexor (40):
   If Sφ=φ, wait
   If Sφ=1, continue
1.32 Enable DES unit output: C4←1
1.32 Load Output Register (70) from DES unit: C9←1
   Set: C11=1
1.33 Test Status Condition Multiplexor (40):

---
If counter (50) count ≠ φ, go to step 1.34
                       = φ, go to step 1.35
---

1.34 Decrement Counter (50).
   Go to step 1.27
1.35 Enable DES unit output: C4←1.
   Write DES unit output into WORKSPACE area of Message Store.
1.36 Test Status Condition Multiplexor (40):

If Address Generator status line indicates all RANK digits have been used, go to step 4. Otherwise, go to step 1.37.

1.37 Increment Register (64): C7←1, go to step 1.26.

4. [This section of CONTROL ROM (42) contains a series of control words the execution of which results in the sequential readout of the message (from the MESSAGE area of Message Store (32)) followed by the readout of the Keyed Signature Sequence elements (from the WORKSPACE area). These data are passed to the Microprocessor Terminal Controller for transmission over the Public Data Network to the indended recipient.]

Notes related to "Step 1" of OSL:

1. Address Generator (AG) (34) has accumulated the message byte count during the loading of the message into the Message Store (MS) (32). The count is the number, N, of 8-byte blocks comprising the message. The final block may be less than 8 bytes, in which case the balance of the block is padded with zeroes. The above implies, but does not demand, that the bus structures be 64-bits wide; however, some hardware actions (e.g., 1.12, ..., 1.15) have been written so as to assume the existence of 64-bit wide data paths within and between functional units.

2. AG can be set to point initially at the beginning of various allocated areas in the Message Store such as at the Message File area, the Workspace area, and the RANK area. AG also updates the pointer positions as data are moved in or out of the region. When the last RANK digit has been read out of RANK space of Message Store, a status line from AG to the Status Condition Multiplexor (40) is set to 1 to indicate all RANK digits have been called up.

OPERATION SEQUENCE LIST 2

Step

2. "Generate Successors of Message Signature."

2.1 Perform operations in steps 1.1 through 1.21 of Operation Sequence List 1.

2.2 SET: C1$\phi$=1; C11=1; C2=$\phi$.
Load value of NUM into Register (64) from Microprocessor terminal controller (12).

2.3 Load counter (50) with one's—complement of the RANK digit from the RANK area of Message Store (32).

2.4 Load Output Register (70) with signature element from Message File area of Message Store (32).

2.5 Load KEY input to DES unit: C$\phi$←1.

2.6 Load DATA input to DES unit: C1←1.

2.7 Convert data in DES unit: C3←1.

2.8 Test Status Condition Multiplexor (40):
If S$\phi$=$\phi$, wait
If S$\phi$=1, continue 2.9 Enable DES unit output: C4←1.

2.10 Load Output Register (70) from DES unit: C9←1.

2.11 Test Status Condition Multiplexor (40):

---

If Counter (50) Count ≠ $\phi$, Go to step 2.12.
= $\phi$, Go to step 2.13.

---

2.12 Decrement Counter (50). Go to step 2.5.

2.13 Enable DES unit output=C4←1.
Write DES unit output (computed successor) into WORKSPACE area of Message Store (32).

2.14 Test Status Condition Multiplexor (40):
If Address Generator status line indicates that all RANK digits have been used, Go to step 3.
Otherwise, Go to step 2.15.

2.15 Increment NUM Register (64). Go to step 2.3.

OPERATION SEQUENCE LIST 3

Step

3. "Successors Match References?"

3.1 Load DATA Register (39) with next COMPUTED SUCCESSOR from WORKSPACE area of Message Store (32): C12←1.

3.2 Read next Reference Signature from Contrast Table onto Data Bus from Microprocessor terminal controller.

3.3 Test Status Condition Multiplexor (40):
If status line S1=$\phi$, Go to step 3.4.
If status line S1=1, Go to step 3.5.

3.4 Test Status Condition Multiplexor (40):
If Address Generator status line indicates that all Reference Signatures have been used,
Go to step 3.6.
Otherwise, Go to step 3.1.

3.5 Go to Operation Sequence for "block 23".

3.6 Go to Operation Sequence for "block 21".

It would require routine skills on the part of an engineer familiar with the particular hardware configuration of the microprocessor controller to produce the required micro-code format for storing in the control ROM 42 of the control unit of the SPU shown on FIG. 4. As will be apparent the details of the control words would vary markedly depending on the particular hardware configuration of the control unit and overall SPU. However, the functional operations required of said control unit for the particular embodiment set forth and described herein are clearly and unambiguously set forth in the above Operational Sequence list.

Industrial Applicability

As will be apparent from the previous detailed description of the present invention, it provides an extremely powerful and reliable tool for effecting a communications protocol for conducting various high integrity business transactions over conventional communication lines wherein two parties to a transaction may place very high reliance on the accuracy and integrity of the system and thus the messages received utilizing same. It will, of course, be obvious that the prime requisite of the system is that the various users maintain their secret encryption keys $K_X$ in the strictest confidence. It should be noted that it is inherent in the present system that it is virtually impossible for either of the users to obtain the key of the other user by even the most sophisticated penetration schemes. Any other means of obtaining the secret keys as by theft are outside of the scope of the present invention and will not be discussed further.

The uses of the herein disclosed identity and transaction verification system are manifold in the modern day business environment. As stated above, the system assures virtually a foolproof method of guaranteeing both the identity of a sender or originator of a message insofar as the receiver is concerned and at the same time guarantees the content or integrity of the "received" message to the original sender. The ultimate result of these assurances is that long distance telecommunications facilities may be utilized for the real time completion of transactions which could only be performed in the past utilizing much more time consuming conventional methods such as, regular mail wherein signatures could be examined for authenticity or by actually having people meet to consumate the various transactions.

Thus for example, legally binding contracts could be effected by having both parties to the contract send an additional data or message portion to the other, each having his own unique signature appended thereto, plus each party to the transaction would have his own resident copy of the contract, electronically signed by the other party and wherein the actual wording of the contract would be verifiable at any time in the future, if a conflict arose and allegations were made that the wordings were at variance.

Similarly, long distance highly verifiable purchase orders could be made between individuals where, due to the nature of the transaction, or the amount of money involved were great, the receiver of such a message would not normally act until the identity of the sender were irrevocably established as well as the specific order.

The system would also have applicability for such a commercial purpose as telephone ordering (i.e., local terminal) by an individual from a large, centrally located store, wherein both ordering and funds transfer could be handled in a highly reliable manner utilizing various aspects of the presently disclosed system.

In short, any area where the identity of the sender and the actual content of the transmitted message must both be firmly established would be possible candidates for use of the present invention.

In summary, the present system, as disclosed, prevents masquerading by any party (not having access to the secret keys) even though he has access to eavesdropping equipment over the line. It also prevents the gathering of any useful information via eavesdropping which could be subsequently used to bypass the present security system. The only actual data which could be obtained by an eavesdropper, which might or might not prove useful, would be the actual message content of the unencrypted portions of the message. It will be readily understood that this could be easily avoided by utilizing further cryptographic transmission security via the DES hardware already present in each terminal. In such cases all messages would be transmitted using an overall system message transmission key ($K_T$) known to all users but not, presumptively, to have an eavesdropper. Such encryption would be superimposed on the message protocol described herein as will be well understood by those skilled in the art.

It should also be understood that while the present invention has been specifically set forth and described with reference to a preferred embodiment, it will be readily appreciated by those skilled in the art that many changes in form and detail may be made without departing from the spirit and scope of the present invention as set forth in the appended claims.

Having thus described my invention, what I claim as new, and desire to secure by Letters Patent is:

1. A transaction and identity verification system including a plurality of terminals connected together over a common communication channel wherein any given pair of users located at different terminals on this system have exchanged a contract comprising a plurality of reference signatures, each of which constitutes the final member of a one-way keyed signature sequence and each of which is a one-way function of each users secret encryption key ($K_X$) and a number (NUM) known to both parties and wherein each terminal connected to said system includes:
   means for generating a multi-digit ranking vector which is a cryptographic function of the entire message (DATA) to be transmitted,
   means for forming as many signature elements as there are digits in said ranking vector, the particular signature element being an intermediate member of a predetermined keyed signature sequence specified by an associated digit of the ranking vector,
   said means for forming including means for initiating the generation of a separate keyed signature sequence to derive each signature element,
   means for continuing that keyed signature sequence generation until the particular keyed signature sequence element ($KSS_p$) specified by the associated ranking vector digit ($p$) has been generated,
   means for transmitting said message (DATA) together with all of said signature elements to another predetermined terminal connected to said system,
   means operable upon the receipt of a signed message from another terminal for deriving a ranking vector for said received message which is a function of the message (DATA) received,
   means for deriving a successor one-way keyed signature sequence reference element from each received signature element,
   means for comparing the derived keyed signature sequence reference elements with the associated keyed signature sequence reference elements in the contract of reference signatures previously exchanged between the users.

2. A transaction and identity verification system as set forth in claim 1 wherein the means for deriving the keyed signature sequence reference elements for received messages includes means for utilizing the associated digit of the ranking vector and for accessing and utilizing an associated number (NUM) from the exchanged contract table to derive each said keyed signature sequence reference element.

3. A transaction and identity verification system as set forth in claim 2 wherein the means for generating both the original one-way keyed signature sequence reference elements and individual signatures include means for utilizing a particular user (X's) secret encryption key ($K_X$) as the initial key input to a key controlled block cypher cryptographic module and utilizing a predetermined number (NUM) previously agreed upon between the parties as at least a part of the data input to said key controlled block cypher cryptographic module to produce the first member ($KSS_0$) of each keyed signature sequence and means for producing subsequent members of each sequence by key chaining the output of the cryptographic module whereby said output becomes at least a portion of the key input for the next subsequent cryptographic operation in accordance with the formula:

$$KSS_i = DES(KSS_{i-1}, NUM \oplus KSS_{i-1}).$$

4. A transaction and identity verification system as set forth in claim 3 including means for combining NUM with the data used as the key to form the input to the DATA input of said cryptographic module as each element of the keyed signature sequence is generated.

5. A transaction and identity verification system as set forth in claim 3 wherein said means for deriving a one-way keyed signature sequence reference element from the signature element appended to the received message comprises means for utilizing the received signature element as an initial key input to a key controlled block cypher cryptographic module and said predetermined associated number (NUM) from the previously exchanged signature contract as at least a portion of the data input to said cryptographic module, means for initiating the cryptographic routine and for utilizing the output of one cryptographic routine as the key input for the next operation, and means for iteratively continuing the one-way keyed signature sequence generation operation as a function of the value of the derived ranking vector digit to produce the required reference signature element.

6. A transaction and identity verification system as set forth in claim 5 wherein the means for generating the ranking vector for both a received message and for a message to be transmitted, includes performing a compressed encoding operation upon said entire message (DATA) whereby any given segment of said compressed encoding is a mathematical function of all of the preceding data input to said encryption operation as defined by:

$$y_n = f(DES(KEY, x_1, x_2, \ldots, x_n))$$

wherein $y_n$ is the $n^{th}$ output block from the cryptographic module and wherein $x_1 \ldots x_n$ represent the first n input blocks to the cryptographic module.

7. A transaction and identity verification system as set forth in claim 6, including means for using different values of NUM from the contract table for different transactions, whereby a different value of NUM will be used in generating both the individual signatures in a given transaction and in all subsequent transactions.

8. A transaction and identity verification system as set forth in claim 2, including means operative, on a successful validation of an original message and its appended signatures, to form a return message (ACK) for sending to the originating user, including means for repeating at least a part of the original message (DATA) acknowledging receipt of the properly signed original message from which the original sender may ascertain that said original message was accurately received.

9. A transaction and identity verification system as set forth in claim 8, including means for generating a set of signatures for said return message (ACK) utilizing exactly the same procedure as for generating an original message (DATA).

10. A transaction and identity verification system as set forth in claim 9, including means for retaining all messages, including the appended signatures both sent and received by the system together with a indication of the identity of the user to whom and from whom a particular message was transmitted and also an indication of the particular transaction number of said message.

11. A transaction and identity verification system as set forth in claim 10, including means for sending an error message to the sender a received message, when the signatures appended to said message do not match the reference signatures in the contract table, and means responsive to the receipt of such an error message to retrieve the original message from said retaining means to retrieve the original message, regenerate the required signatures in accordance with the content of such message, and retransmit the same to the sender of the error message.

12. A method for verifying the content of a message and the identity of the sender, said method comprising two participants (USER A and USER B) first exchanging a contract containing two finite sequences of keyed-reference-signatures:

$$KSS_r(k_A,1) KSS_r(k_A,2), \ldots$$

$$KSS_r(k_B,1) KSS_r(k_B,2), \ldots$$

wherein the $j^{th}$ reference signature $KSS_r(k_X,j)$ of USER X is the $r^{th}$ or final term in the $j^{th}$ keyed-signature-sequence $$KSS_0(k_X,j) KSS_1(k_{Xi},j), \ldots, KSS_r(k_X,j)$$

whose terms are defined and related as follows: the initial element $$KSS_0(k_X,j)$$

of the $j^{th}$ sequence is derived from USER X's (secret) key $k_X$ and the index j specifying the keyed-signature-sequence by means of the rule $$KSS_0(k_X,j) = DES\{k_X,j + k_X\}$$

where DES denotes the Data Encryption Standard and wherein each succeeding element $KSS_i(k_X,j)$ with i=1, 2, ..., r of the $j^{th}$ keyed-signature-sequence is derived from the immediately preceding element $KSS_{i-1}(k_X,j)$ by a known algorithm f according to the rule $$KSS_i(k_A,j) = f(KSS_{i-1}(k_A,j))$$

to transmit signed data to USER B, USER A, appending to DATA a number s of signatures $$DATA, SIG_0, SIG_1, \ldots, SIG_{s-1}$$

the $t^{th}$ signature $SIG_t$ where $t = 0, 1, \ldots, s-1$ being the element in position $\rho_t$ $$KSS_{\rho_t}(k_A, NUM_t)$$

in USER A's $NUM_t^{th}$ keyed-signature-sequence $$KSS_0(k_A, NUM_t), KSS_1(k_A, NUM_t), \ldots, KSS_r(k_A, NUM_t)$$

the position $\rho_t$ of the $t^{th}$ signature $SIG_t$ being determined by the rank of the data $$\rho_0, \rho_1, \ldots, \rho_{s-1}$$

USER A determining the rank of data to produce a sequence of s numbers $$\rho_0, \rho_1, \ldots, \rho_{s-1}$$

each term being an integer having one of the values 0, 1, ..., r−1. The value of the $t^{th}$ term $\rho_t$ depends on DATA through a predetermined cryptographic protocol, USER B, upon receipt of the signed message $$DATA, SIG_0, SIG_1, \ldots, SIG_{s-1}$$

independently determining the rank of DATA, $p_0, p_1, \ldots, p_{s-1}$

USER B then deriving presumptive values for the s reference elements by computing the appropriate successor reference signatures for each of the s appended signatures; as defined by:

$r - p_0^{th}$ successor of $SIG_0$ $r - p_1^{th}$ successor of $SIG_1$ $\ldots$
$\ldots$
$\ldots$ $r - p_{s-1}^{th}$ successor of $SIG_{s-1}$ USER B comparing the computed successor reference elements to the corresponding reference signatures in the previously exchanged contract, and USER B accepting the transaction if and only if there is complete agreement.

13. A method for verifying as set forth in claim 12, including both users keeping accurate records of the transactions occurring between themselves wherein a transaction comprises a complete message exchange protocol, and accessing a particular set of numbers (NUM's) from the exchanged contract table for use in generating the respective keyed signature sequences dependent upon which transaction is currently being performed, and ensuring that new values of NUM are selected from the contract table for successive transactions.

14. A method as set forth in claim 13 including the steps of both users keeping detailed archival records of all messages including appended signatures, both sent and received, together with a copy of the contract to which they apply, and clearly identifying the parties to each such message as well as clearly identifying the particular transaction number.

15. A method as set forth in claim 14, further including USER B, upon a successful determination that a received message (DATA), $SIG_0$, $SIG_1$, $\ldots$ $SIG_{s-1}$ received from USER A is correct and validly signed, preparing a return message (ACK) including as much of the original message (DATA) as necessary for USER A to determine that USER B has received the correct message, deriving a ranking vector for this new message (ACK), generating a set of s signatures for this message utilizing his own secret keyed $K_B$ the just generated ranking vector, and the values of NUM utilized by USER A in sending the original message, and appending these signatures to the message ACK and sending same back to USER A, USER A upon receipt of the message (ACK), deriving the ranking vector from the message (ACK), generating the appropriate keyed signature sequence reference elements therefrom and comparing the received reference signatures with those contained in the appropriate portions of the previous exchanged contract table and give identical considering the transaction as terminated.

16. A communication method whereby users of a public data network may upon receipt of a message over the network, verify both the content of the message (DATA) and the identity of the sender wherein said network comprises a plurality of terminals connected together over a common communication channel, and wherein each terminal has the ability to perform a key controlled block cypher cryptographic operation, said method comprising:

any given pair of users located at different terminals on the system first exchanging a contract comprising a plurality of reference signatures, each of which constitutes the final member of a one-way keyed signature sequence and each of which is a one-way function of each user's secret encryption key ($K_X$) and a number (NUM) known to both parties, and included specifically in the contract, subsequently when a sending user (sender) wishes to send a message (DATA) to a receiving user, performing the steps of generating a multi-digit ranking vector ($p_0 \ldots p_{s-1}$) which is a predetermined cryptographic function of the entire message (DATA) to be transmitted, forming as many signature elements ($SIG_0 \ldots SIG_{s-1}$) as there are digits in said ranking vector, the particular signature element formed being an intermediate member of a predetermined one-way keyed signature sequence specified by an associated digit of the ranking vector, transmitting said message (DATA) together with all s signature elements to another predetermined terminal connected to said system, the receiving user, upon the receipt of a signed message from another terminal, deriving a ranking vector $p_0 \ldots p_{s-1}$ for said received message (DATA) which is also a predetermined cryptographic function of the message (DATA) received, and then, deriving a successor one-way keyed signature sequence reference element from each received signature element, comparing the derived keyed signature sequence reference elements with the associated keyed signature sequence reference elements contained in the contract of reference signatures previously exchanged between the users, and accepting the message (DATA) as validly signed if said comparison is successful.

17. A communication method as set forth in claim 16, the step of a sending user forming the signature elements including the steps of generating the initial member of a one-way keyed signature sequence utilizing USER A's own secret encryption key and a predetermined number (NUM) previously agreed on between the users, continuing the generation of successive elements of each one-way keyed signature sequence utilizing key chaining until the element of said one-way keyed signature sequence is generated which is specified by the associated digit of said ranking vector.

18. A communication method as set forth in claim 17 wherein the receiving user deriving a successor one-way keyed signature sequence reference element includes the steps of utilizing each received signature element as an initial key input to the key controlled block cypher cryptographic operation and said predetermined associated number (NUM) extracted from the previously exchanged signature contract as at least a portion of the data input to said cryptographic operation, performing said cryptographic operation and utilizing the output thereof as the input to the next generation sequence and continuing this operation iteratively until the desired one-way keyed signature sequence reference element is generated.

19. A communication method as set forth in claim 17, including the receiving user's determining the number of iterations to be performed in forming said one-way signature sequence reference elements as a function of the associated digit of said previously generated ranking vector.

20. A communication method as set forth in claim 16, including the receiving user, subsequent to the receipt of a properly signed message DATA, forming a return message (ACK) for transmission to the original sending user, containing as much of the original received message (DATA as necessary in order for the original sending user to ascertain that the original message was accurately received, acknowledging receipt of said properly signed message said receiving user preparing a set of signatures for said return message (ACK) in exactly the same manner the original sending user generated the signatures and appending said newly generated signatures to the message (ACK) and then transmitting same to the sending user.

21. A communication method as set forth in claim 20, including the original sending receiver, after receiving the message (ACK) with its appended signatures, generating a ranking vector for the message (ACK) and deriving the required one-way keyed signature sequence reference elements from these received signatures and comparing them against the previously exchanged contract table.

22. A communication method as set forth in claim 21 including each user retaining all messages received and transmitted together with the appended signatures in an archival file for possible future reference.

23. A communication method as set forth in claim 22 further including a protocol for resolving disputes between USER A and USER B relative to the validity of a signature comprising providing a trusted arbiter who is capable of performing a key controlled block cipher cryptographic operation identical to that utilized by USERS A and B with the precise method utilized for generating both the ranking vector and the one-way keyed signature sequences (KSS) and also providing said arbiter with the original signature contract and the exact message whose signature is disputed together with the signatures to be verified, said arbiter independently generating a set of KSS reference elements from the disputed signatures and the value of NUM taken from the previously obtained signature contract and determining if the reference elements which the arbiter has generated match the reference elements in the signature contract and resolving the dispute in favor of the party, claiming that the signature is correct, if the generated reference elements do, in fact, match those in the contract.

24. A communication as set forth in claim 23 further including a protocol for resolving a conflict wherein USER A disputes the content of a particular message DATA' comprising said arbiter obtaining the message DATA together with its appended signatures from USER B, which USER B claims he received and then obtaining the message DATA which USER A claims he sent independently generating the ranking vectors for each of the messages DATA and DATA' and comparing them digit by digit and determining if the following relationship exists:

$$\rho(DATA',t) \leq \rho(DATA,t) 0 = 23t < s$$

said relationship exists finding that the message DATA' is valid and the message DATA is invalid.

* * * * *